United States Patent
Kabakian et al.

(10) Patent No.: US 11,333,753 B2
(45) Date of Patent: May 17, 2022

(54) STRIPMAP SYNTHETIC APERTURE RADAR (SAR) SYSTEM UTILIZING DIRECT MATCHING AND REGISTRATION IN RANGE PROFILE SPACE

(71) Applicant: The Boeing Company, Chicago, IL (US)

(72) Inventors: Adour V. Kabakian, Monterey Park, CA (US); Soheil Kolouri, Calabasas, CA (US); Brian N. Limketkai, Santa Monica, CA (US); Shankar R. Rao, Norwalk, CA (US)

(73) Assignee: The Boeing Company, Chicago, IL (US)

( * ) Notice: Subject to any disclaimer, the term of this patent is extended or adjusted under 35 U.S.C. 154(b) by 259 days.

(21) Appl. No.: 16/601,554

(22) Filed: Oct. 14, 2019

(65) Prior Publication Data

US 2021/0109210 A1 Apr. 15, 2021

(51) Int. Cl.
*G01S 13/90* (2006.01)

(52) U.S. Cl.
CPC ...... *G01S 13/9054* (2019.05); *G01S 13/9004* (2019.05); *G01S 13/9094* (2013.01)

(58) Field of Classification Search
None
See application file for complete search history.

(56) References Cited

U.S. PATENT DOCUMENTS

| | | | | |
|---|---|---|---|---|
| 6,738,009 B1 * | 5/2004 | Tsunoda | ............. | G01S 13/9054 342/191 |
| 7,609,198 B2 * | 10/2009 | Chang | ..................... | G01S 13/89 342/179 |
| 2018/0372862 A1 * | 12/2018 | Ni | ...................... | G01S 13/9052 |

OTHER PUBLICATIONS

D. G. Lowe, "Distinctive Image Features from Scale-Invariant Keypoints," International Journal of Computer Vision, vol. 60, No. 2 pp. 91-110, Jan. 5, 2004, Vancouver, B.C., Canada.
B. Wessel, M. Huber, and A. Roth, "Registration of near real-time sar images by image-to-image matching," 2007 PIA-Photogrammetric Image Analysis, vol. 3, pp. 179-184, Sep. 19, 2007, Weßling, Germany.

* cited by examiner

*Primary Examiner* — Vladimir Magloire
*Assistant Examiner* — Artem Melkunov
(74) *Attorney, Agent, or Firm* — Haynes and Boone, LLP

(57) ABSTRACT

Described is a stripmap SAR system on a vehicle comprising an antenna that is fixed and directed outward from the side of the vehicle, a SAR sensor, a storage, and a computing device. The computing device comprises a memory, one or more processing units, and a machine-readable medium on the memory. The machine-readable medium stores instructions that, when executed by the one or more processing units, cause the stripmap SAR system to perform various operations. The operations comprise: receiving stripmap range profile data associated with observed views of a scene; transforming the received stripmap range profile data into partial circular range profile data; comparing the partial circular range profile data to a template range profile data of the scene; and estimating registration parameters associated with the partial circular range profile data relative to the template range profile data to determine a deviation from the template range profile data.

20 Claims, 22 Drawing Sheets

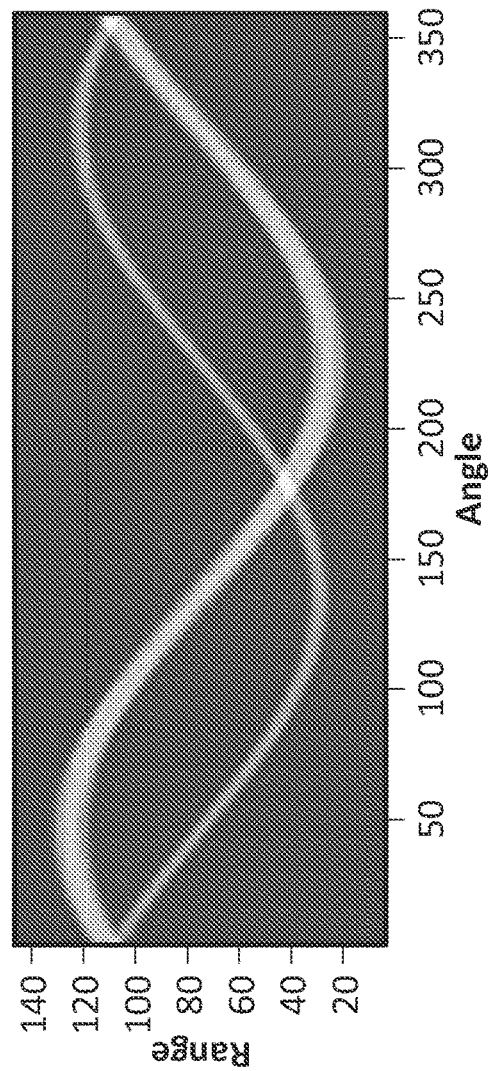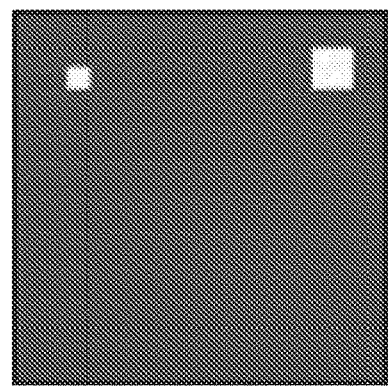

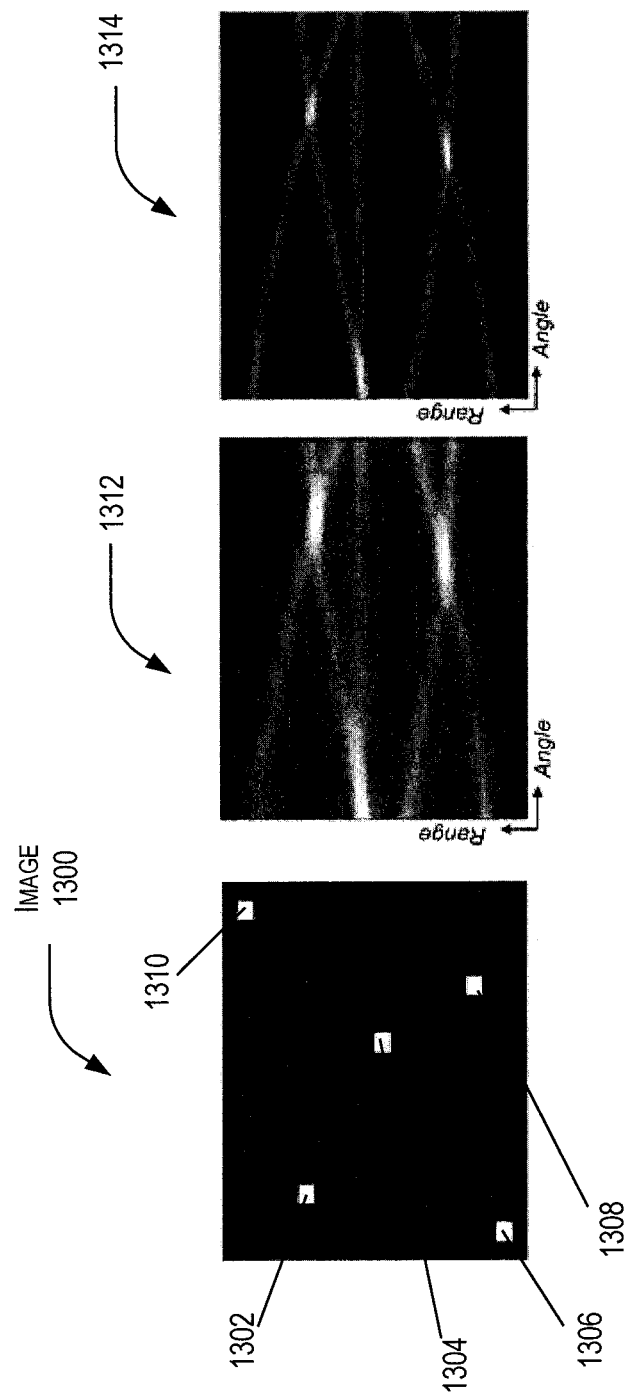

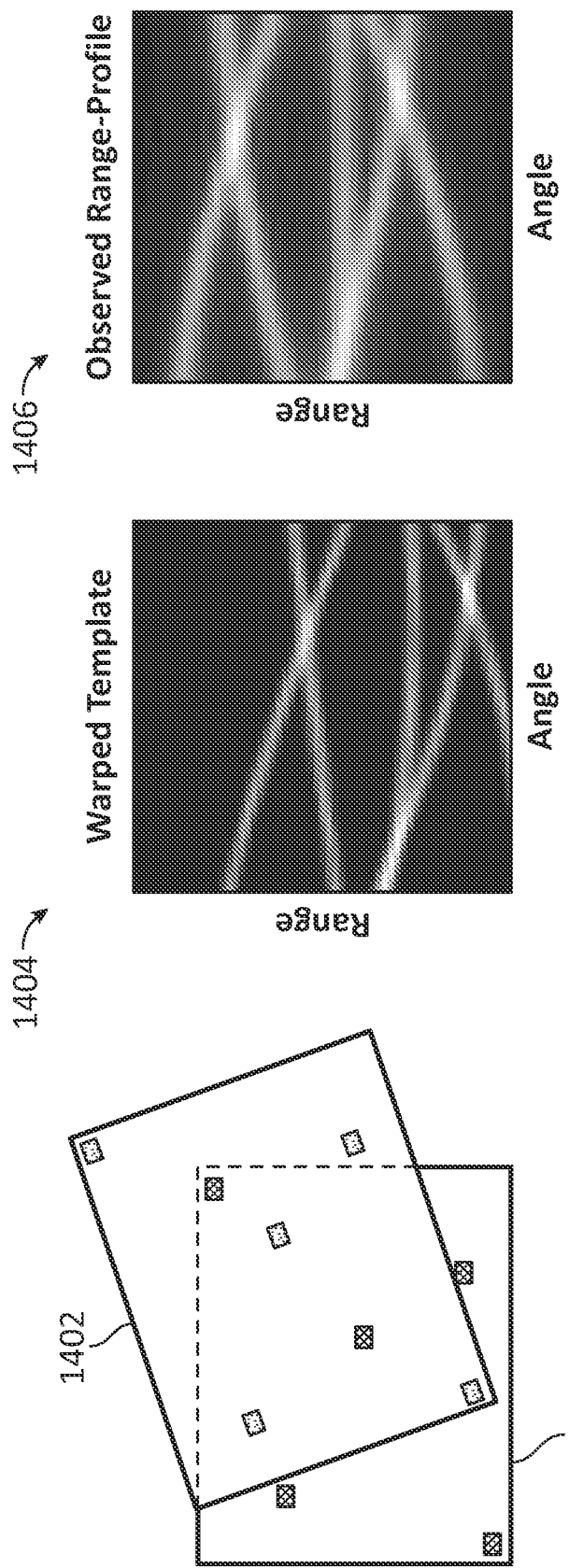

STRIPMAP SYNTHETIC APERTURE RADAR (SAR) SYSTEM UTILIZING DIRECT MATCHING AND REGISTRATION IN RANGE PROFILE SPACE

TECHNICAL FIELD

The present disclosure is related to Synthetic Aperture Radar (SAR) mapping and registration, and more particularly, for example, to techniques for range profile based SAR mapping and registration.

BACKGROUND

In some global positioning system (GPS) denied environments, for example, navigation guidance is provided by synthetic aperture radar (SAR) imagery. In the field of SAR based navigation systems, there is an ongoing effort to reduce computational complexity and required resources, particularly on autonomous platforms that have limited computational power.

Traditional SAR imagery navigation systems apply techniques developed in image processing for matching and registration of processed SAR images of a scene to expected ground landmarks of the same scene. In general, to achieve registration, image processing matching techniques typically attempt to detect salient features in each image, which can be tracked robustly though geometric transformations, such as image rotations, scaling, and translation. Unfortunately, compared to optical images, SAR images exhibit various types of noise, such as glint and multiplicative speckle, which reduce the reliability of salient feature detection, which, in turn, reduces the likelihood of successful matching. Known techniques to utilize noise mitigation methods reduce the noise effect, but also tend to soften and wash out the features exploited by the image matching processes. Moreover, these known attempts add additional layers of expensive computations, which makes them ill-suited for low size, weight, and power (SWaP) autonomous systems.

As such, in relation to low SWaP autonomous systems, contemporary SAR based navigation methods require extensive processing and data resources for SAR image reconstruction and feature detection which can present several challenges for SAR based navigation on platforms, such as for example for systems with limited computational power and resources.

SUMMARY

Described is a stripmap synthetic aperture radar (SAR) system on a vehicle. The stripmap SAR system comprises an antenna that is fixed and directed outward from the side of the vehicle, a SAR sensor, a storage, and a computing device. The computing device comprises a memory, one or more processing units, and a machine-readable medium on the memory. The machine-readable medium stores instructions that, when executed by the one or more processing units, cause the stripmap SAR system to perform various operations. The operations comprise: receiving stripmap range profile data associated with observed views of a scene; transforming the received stripmap range profile data into partial circular range profile data; comparing the partial circular range profile data to a template range profile data of the scene; and estimating registration parameters associated with the partial circular range profile data relative to the template range profile data to determine a deviation from the template range profile data.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIGS. 7A and 7B are graphical depictions of an image and a Radon transform of the image in accordance with the present disclosure.

FIGS. 13A-13C are a comparison of three images ranges in accordance with the present disclosure.

FIG. 13A is a terrain image with 5 scattering points.

FIG. 13B is a Radon transform computed by the present disclosure from the stripmap SAR range profiles corresponding to the terrain image shown in FIG. 13A in accordance with the present disclosure.

FIG. 13C is a direct Radon transform from FIG. 13A in accordance with the present disclosure.

FIGS. 14A-14C are another comparison of four images in accordance with the present disclosure.

FIG. 14A is an observed image and template that are rotated and translated with respect to each other.

FIG. 14B is a Radon transform of range-profiles of the template shown in FIG. 14A in accordance with the present disclosure.

FIG. 14C is a Radon transform derived from the observed stripmap SAR range profiles of the observed image shown in FIG. 14A in accordance with the present disclosure.

DETAILED DESCRIPTION

Figure 1A:
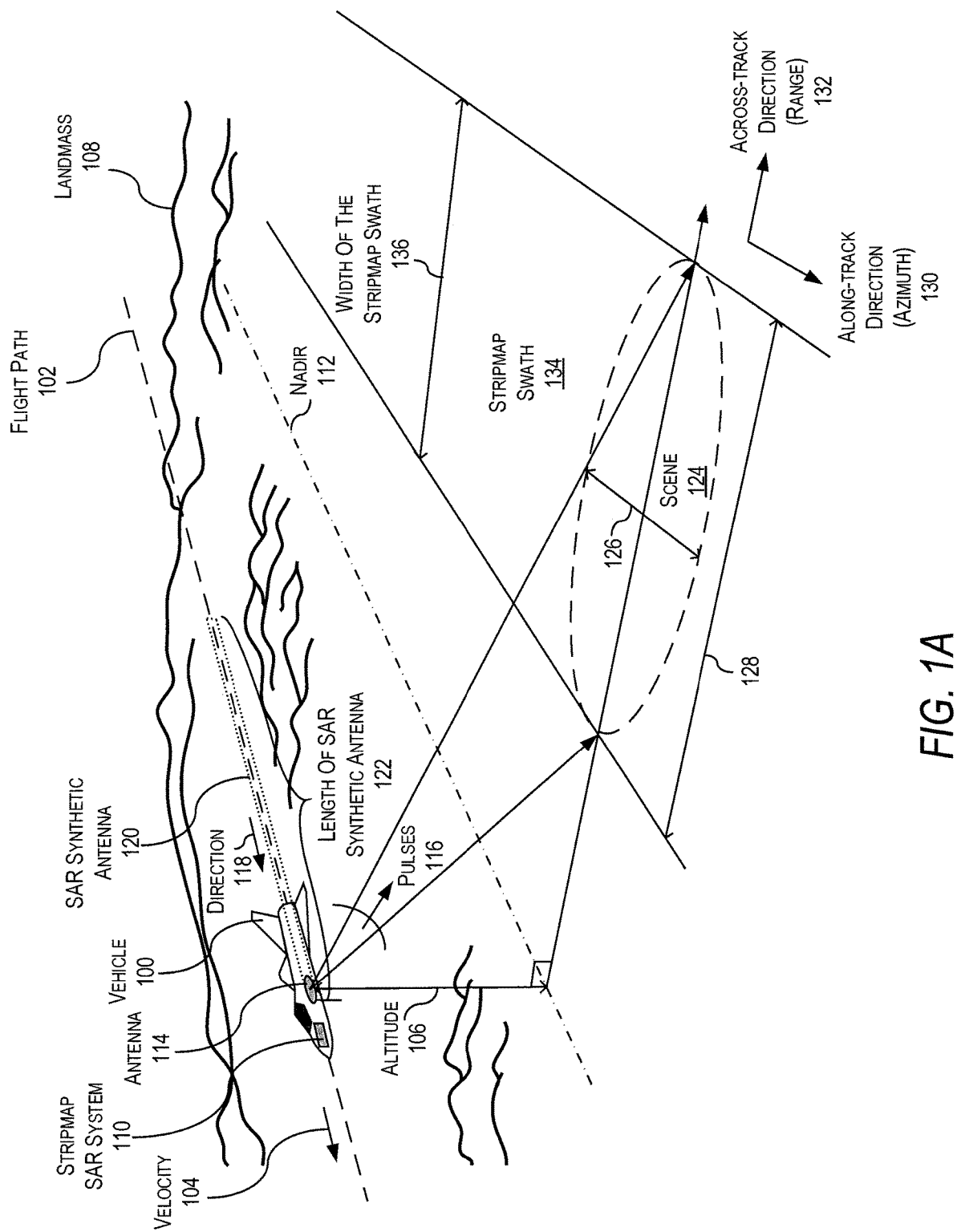
FIG. 1A is a perspective view of a diagram of an example of an implementation of a stripmap Synthetic Aperture Radar (SAR) system in a vehicle flying a course along a flight path over a landmass in accordance with the present disclosure.

Systems and methods are disclosed for matching and registration of synthetic aperture radar (SAR) phase history data of a scene with a pre-stored template of the same scene to furnish navigation guidance information in accordance with the present disclosure. As an example, in a GPS denied environment, a vehicle such as, for example, a drone, an aircraft, a spacecraft, or other type of unmanned or manned vehicle may rely on SAR-based imaging to provide navigation. Disclosed is a system comprising a stripmap mode SAR and a signal processing method for performing matching and registration directly on stripmap SAR range profile data without requiring SAR image reconstruction and feature detection. The system utilizes the signal processing method to transform received stripmap mode SAR range-profile data scattered by the terrain into partial circular mode SAR range-profile data. The partial circular mode SAR range-profile data is then compared with a pre-stored template to determine a deviation from the pre-stored template.

Specifically, a stripmap SAR system on a vehicle is described. The stripmap SAR system comprises an antenna that is fixed and directed outward from the side of the vehicle, a SAR sensor, a storage, and a computing device. The computing device comprises a memory, one or more processing units (also referred to as "one or more processors"), and a machine-readable medium (also referred to as a "machine-readable media") on the memory. The machine-readable medium stores instructions that, when executed by the one or more processing units, cause the stripmap SAR system to perform various operations. The operations comprise: receiving stripmap range profile data associated with observed views of a scene; transforming the received stripmap range profile data into partial circular range profile data; comparing the partial circular range profile data to a template range profile data of the scene; and estimating registration parameters associated with the partial circular range profile data relative to the template range profile data to determine a deviation from the template range profile data.

The stripmap SAR system disclosed reduces the computation, memory, and transmission bandwidth required of a conventional SAR-based navigation system. Unlike the stripmap SAR system disclosed, conventional SAR navigation systems typically utilize techniques that attempt to match salient features in multiple SAR images that may be easily detected and matched. As such, conventional SAR-based navigation systems generally construct multiple SAR images for use with these navigation techniques and, resultingly, require extensive computation resources, memory, and transmission bandwidth. The stripmap SAR system does not need to perform any image reconstruction and, instead, utilizes a computationally less intensive processing method. The lighter computation load results in reduced size, weight, and power (SWaP).

Generally, a SAR is a coherent mostly airborne or space-borne side-looking radar system ("SLAR") which utilizes the flight path of a moving platform (e.g., a vehicle such as, for example an aircraft or satellite), on which the SAR is located, to simulate an extremely large antenna or aperture electronically, and that generates high-resolution remote sensing imagery. SAR systems are used for terrain mapping and/or remote sensing using a relatively small antenna installed on the moving vehicle in the air.

Turning to FIG. 1A, a perspective view of a diagram of an example of an implementation of a stripmap SAR system in a vehicle 100 flying along a straight flight path 102 with a constant velocity 104 and at a constant altitude 106 over a landmass 108 in accordance with the present disclosure. The vehicle 100 (also known as a platform) may be, for example, a manned or unmanned aircraft such as an airplane, a drone, a spacecraft, a rotorcraft, or other type of unmanned or manned vehicle. The vehicle 100 flies along the flight path 102 at the constant altitude 106 such that a stripmap SAR system 110 (on the vehicle 100) is directly above a nadir 112. In this example, the nadir 112 is a locus of points on the surface of the Earth (e.g., the landmass 108) directly below an antenna 114 of the stripmap SAR system 110. It is appreciated by those of ordinary skill in the art that in radar systems the nadir 112 is the beginning of the range parameter of a SAR radar.

In an example of operation, the stripmap SAR system 110 radiates (e.g., transmits) SAR radar signal pulses 116 obliquely at an approximate normal (e.g., a right angle) direction to a direction 118 of the flight along the flight path 108. The SAR radar signal pulses 116 are electromagnetic waves that are sequentially transmitted from the antenna 114, which is a "real" physical antenna located on the vehicle 100. As an example, the SAR radar signal pulses 116 can be linear frequency modulated chip signals.

The antenna 114 is fixed and directed (e.g., aimed) outward from a side of the vehicle 100 at an obliquely and approximately normal direction to the side of the vehicle 100. The antenna 114 has a relatively small aperture size with a correspondingly small antenna length. As the vehicle 100 moves along the flight path 102, the stripmap SAR system synthesizes a SAR synthetic antenna 120 that has a synthesized length 122 that is much longer than the length of the real antenna 114. It is appreciated by those of ordinary skill in the art that the antenna 114 may optionally be directed in a non-normal direction from the side of the vehicle 100. In this example, the angle at which the fixed antenna 114 is aimed away from the side of the vehicle 100 (and resultingly the flight path 102) will be geometrically compensated in the computations of the stripmap SAR system 110.

As the SAR radar signal pulses 116 hit the landmass 108 they illuminate an observed scene 124 (also referred to as a "footprint," "parch," or "area") of the landmass 108 and scatter (e.g., reflect off the landmass 108). The illuminated scene 124 corresponds to a width 126 and 128 of the main beam of the real antenna 114 in an along-track direction 130 and across-track direction 132 as the main beam intercepts the landmass 102. In this example, the along-track direction 130 is parallel to the direction 118 of the flight path 102 of the vehicle 100 and it represents the azimuth dimension for the stripmap SAR system 110. Similarly, the across-track direction 132 is perpendicular (e.g., normal) to the flight path 102 of the vehicle 100 and it represents the range dimension of the SAR system. As the vehicle 100 travels along the flight path 102, the illuminated scene 124 defines a stripmap swath 134, having a swath width 136, which is a strip along the surface of the landmass 108 that has been illuminated by the illuminated scene 124 produced by the main beam of the antenna 114. In general, the length 122 of the SAR synthetic antenna 120 is directly proportional to the range 132 in that as the range 132 increases, the length 122 of the SAR synthetic antenna 120 increases.

Figure 1B:
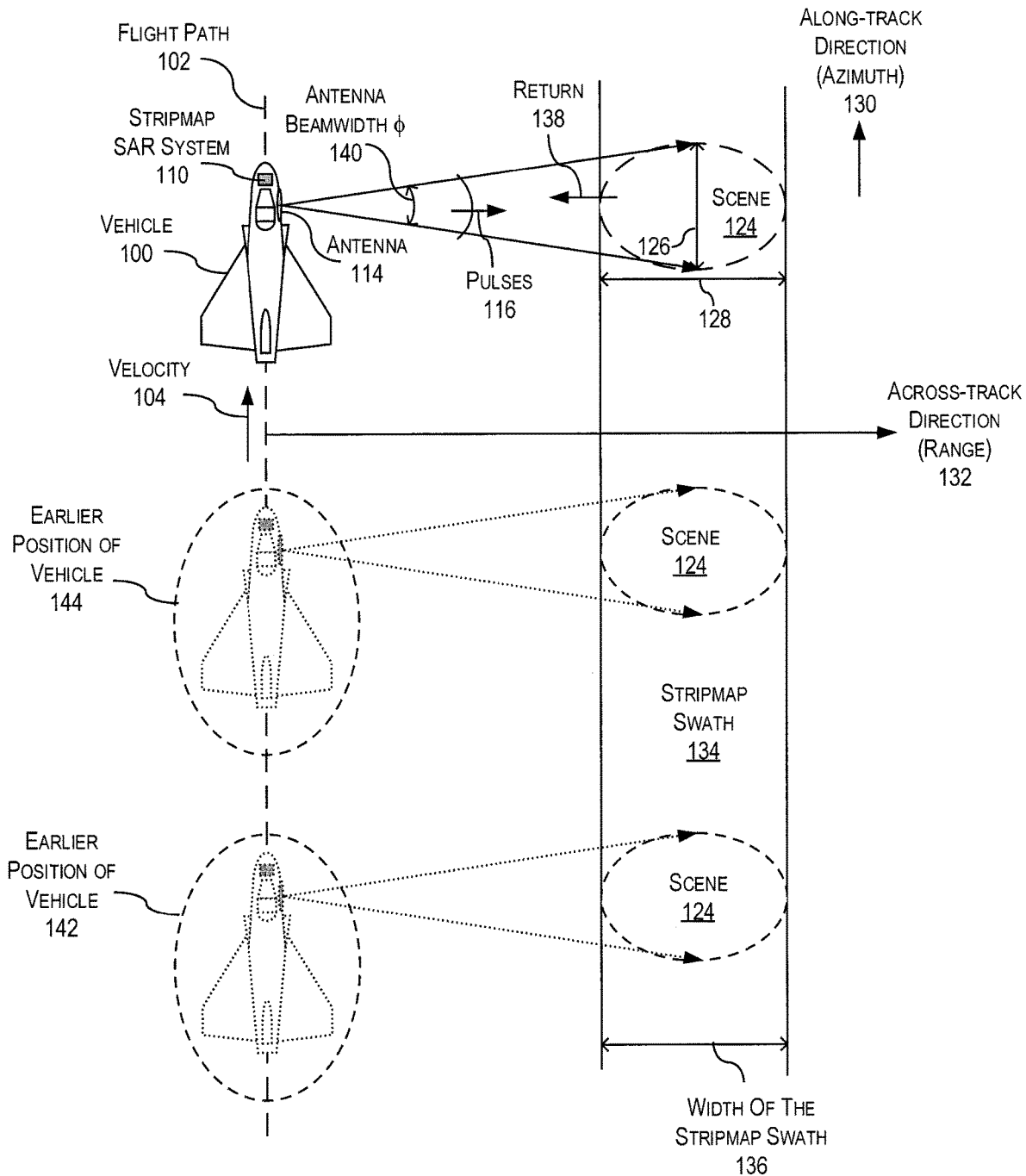
FIG. 1B is a top view of the stripmap SAR system in the vehicle shown in FIG. 1A in accordance with the present disclosure.

In FIG. 1B, a top view of the stripmap SAR system in the vehicle 100 is shown in accordance with the present disclosure. Again, the vehicle 100 is shown flying along the straight flight path 102 with a constant velocity 104. In operation, as the vehicle 100 flies along the flight path 102, the stripmap SAR system 110, through the antenna 114, radiates the SAR radar signal pulses 116 at the ground (e.g., landmass 108) at an approximately normal direction from the flight path 102 (and the along-track direction 130) where the SAR radar signal pulses 116 illuminate the scene 124 of the landmass 108 and scatter. The scatter off the scene 124 produces at least backscatter waves that are radar return signals 138 that have reflected off the landmass 108 and reflected back towards the antenna 114. The antenna 114 receives the radar return signals 138 and passes them to the stripmap SAR system 110 that processes the radar return signals 138. In this example, the processing may include recording and storing the radar return signals 138 in a storage (not shown) in a data grid structure. The stripmap SAR system 100 utilizes consecutive time intervals of radar transmission and reception to receive radar phase history data of the illuminated and observed scene (e.g., scene 124) at different positions along the flight path 102. Normally, the processing the combination of raw radar data (e.g., radar phase history data of illuminated scene) enables the construction of a SAR image (e.g., a high-resolution SAR image) of the captured scene (e.g., scene 124). However, the disclosed stripmap SAR system 100 obviates the need for the construction of SAR images in order to perform a navigation task, instead, the stripmap SAR system 100 estimates the geometric transformation parameters directly from the range profiles of the received phase history data and phase history template data.

In this example, the widths 126 and 128 of the main beam of the antenna 114 are related to the antenna beamwidth φ 140 of the main beam produced by the antenna 114. Additionally, in this example, the vehicle 100 is shown to have traveled along the flight path 102 scanning the stripmap swath 134 at different positions along the flight path 102, where, as an example, the stripmap SAR system 110 is shown to have scanned two earlier scenes 142 and 144 the stripmap switch 134 at two earlier positions 146 and 148 along the flight path 102.

It is appreciated by those of ordinary skill in the art that while the example vehicle 100 shown in FIGS. 1A and 1B is a manned aircraft, this is for illustrative purpose only and the vehicle 100 may also be an unmanned aircraft such as an unmanned aerial vehicle (UAV) or drone.

Figure 2:
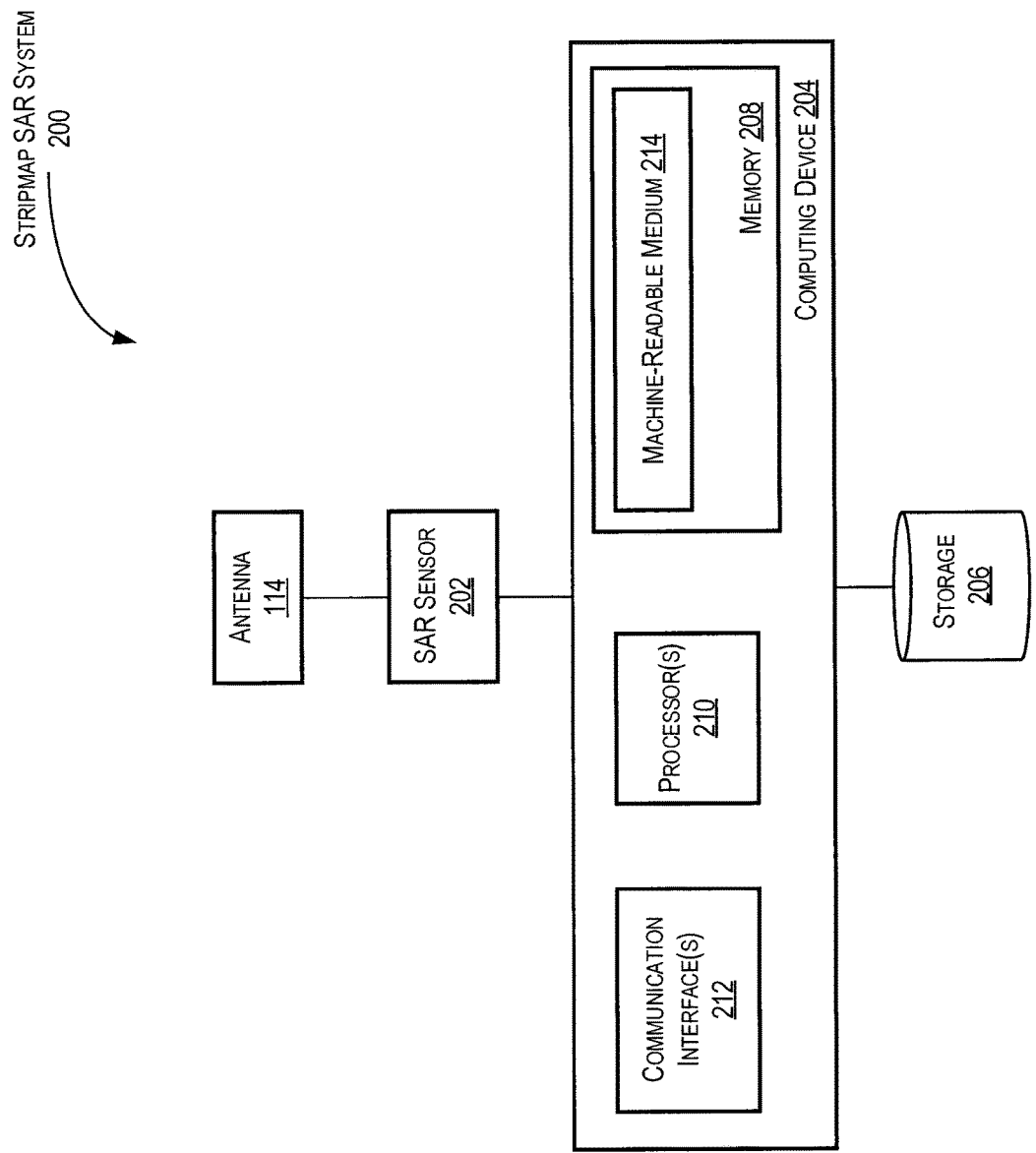
FIG. 2 is a system block diagram of an example of an implementation of the stripmap SAR system, shown in FIGS. 1A and 1B, in accordance with the present disclosure.

In FIG. 2, a system block diagram of an example of an implementation of the stripmap SAR system 200 is shown in accordance with the present disclosure. In this example, the stripmap SAR system 200 includes the antenna 114, a SAR sensor 202, a computing device 204, and a storage 206. The computing device 204 includes a memory 208, one or more processing units 210, and a one or more communication interfaces 212. In this example, the machine-readable medium 214 is on the memory 208 and stores instructions that, when executed by the one or more processing units 210, cause the stripmap SAR system 200 to perform various operations. These operations comprise: receiving stripmap range profile data associated with observed views of a scene (e.g., scene 124); transforming the received stripmap range profile data into partial circular range profile data; comparing the partial circular range profile data to a template range profile data of the scene 124; and estimating registration parameters associated with the partial circular range profile data relative to the template range profile data to determine a deviation from the template range profile data. In general, the stripmap SAR system 200 is utilized to capture and process phase history data from observation views, of the scene(s) 124 in the stripmap swath 134, in accordance with various techniques described in the present disclosure. The stripmap SAR system is generally a SAR navigation guidance system that comprises a SAR radar device that transmits and receives electromagnetic radiation and provides representative data in the form of raw radar phase history data. As an example, the stripmap SAR system 200 is implemented to transmit and receive radar energy pulses in one or more frequency ranges from less than one gigahertz to greater than sixteen gigahertz based on a given application for the stripmap SAR system 200.

In this example, the computing device 204 includes that one or more processing units 210 that include, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory 208 to execute instructions to perform any of the various operations described in the present disclosure. The one or more processing units 210 are adapted to interface and communicate with the memory 208 and SAR sensor 202 via the one or more communication interfaces 212 to perform method and processing steps as described herein. The one or more communication interfaces 212 include wired or wireless communication buses within the vehicle 100.

In various examples, it is appreciated by those of ordinary skill in the art that the processing operations and/or instructions are integrated in software and/or hardware as part of the one or more processing units 210, or code (e.g., software or configuration data), which is stored in the memory 214. The examples of processing operations and/or instructions disclosed in the present disclosure are stored by the machine-readable medium 213 in a non-transitory manner (e.g., a memory 208, a hard drive, a compact disk, a digital video disk, or a flash memory) to be executed by the one or more processing units 210 (e.g., a computer such as a logic or processor-based system) to perform various methods disclosed herein. In this example, the machine-readable medium 214 is shown as residing in memory 208 within the computing devices 204 but it is appreciated by those of ordinary skill that the machine-readable medium 214 may be located on other memory external to the computing device 204, such as for example, the storage 206. As another example, the machine-readable medium 213 may be included as part of the one or more processing units 210.

In this example, the memory 208 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. The memory 208 may include one or more memory devices within the computing device 204 and/or one or more memory devices located external to the computing device 204. The one or more processing units 210 are adapted to execute software stored in the memory 208 to perform various methods, processes, and operations in a manner as described herein. In this example, the memory 208 stores the received phase history data of a scene 124 and/or phase history template data of the same scene 124.

The SAR sensor 202 is utilized to transmit electromagnetic waves (e.g., SAR radar signal pulses 116) and receive backscattered waves (e.g., received phase history data from the radar return signals 138) of scene 124. In this example, the SAR sensor 202 includes a radar transmitter to produce the SAR radar signal pulses 116 that are provided to an antenna 114 and radiated in space toward scene 124 by antenna 114 as electromagnetic waves. The SAR sensor 202 further includes a radar receiver to receive backscattered waves (e.g., radar return signals 138) from antenna 114. The radar return signals 138 are received by SAR sensor 202 as received phase history data of the scene 124. The SAR sensor 202 communicates the received phase history data to the one or more processing units 210 and/or memory 208 via the one or more communication interfaces 212.

The antenna 114 is implemented to both transmit electromagnetic waves (e.g., SAR radar signal pulses 116) and receive backscattered waves (e.g., radar return signals 138). In this example, the antenna 114 is in a fixed position on the vehicle 100 and is directed outward from the side of the vehicle 100 since the stripmap SAR system 200 is operating as a side-looking radar system. The antenna 114 may be implemented as phased-array antenna, horn type of antenna, parabolic antenna, or other type of antenna with high directivity.

The storage 206 may be a memory such as, for example, volatile and non-volatile memory devices, such as RAM, ROM, EEPROM, flash memory, or other types of memory, or a removable storage device such as, for example, hard drive, a compact disk, a digital video disk. The storage 206 may be utilized to store template range profile data of the scenes.

Figure 3:
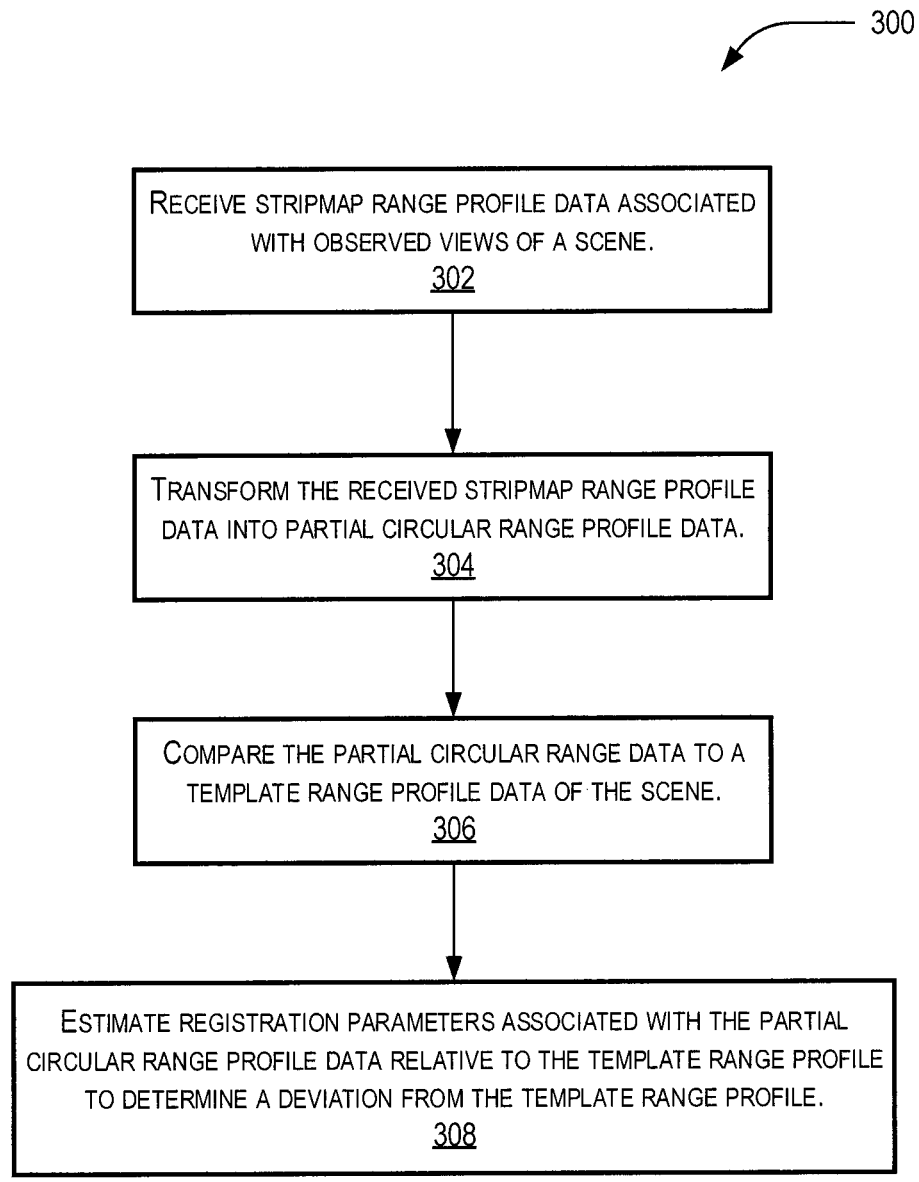
FIG. 3 is a flowchart of an example of an implementation of the method performed by the stripmap SAR system, shown in FIG. 2, in accordance with the present disclosure.

In FIG. 3, a flowchart is shown of an example of an implementation of the method 300 performed by the stripmap SAR system 200 in accordance with the present disclosure. The method 300 begins by receiving 302 stripmap range profile data associated with observed views of a scene. The stripmap range profile data is received by the one or more processing units 210 of the computing device 204, where, in this example, the stripmap range profile data is first received by the SAR sensor 202, via the antenna 114, and communicated to the one or more processing units 210 via the one or more communication interfaces 212. The stripmap range profile data comprises information captured via the stripmap SAR system 200 that is operating in a stripmap mode. Once received, the one or more processing units 210 transform 304 the received stripmap range profile data into partial circular range profile data and compare 306 the partial circular range profile data to a template range profile data of the scene 124. The method 300, then estimates 308 the registration parameters associated with the partial circular range profile data relative to the template range profile data to determine a deviation from the template range profile data. The deviations if any may be utilized to determine a match between the actual observed scene 124 and the template scene.

Figure 4:
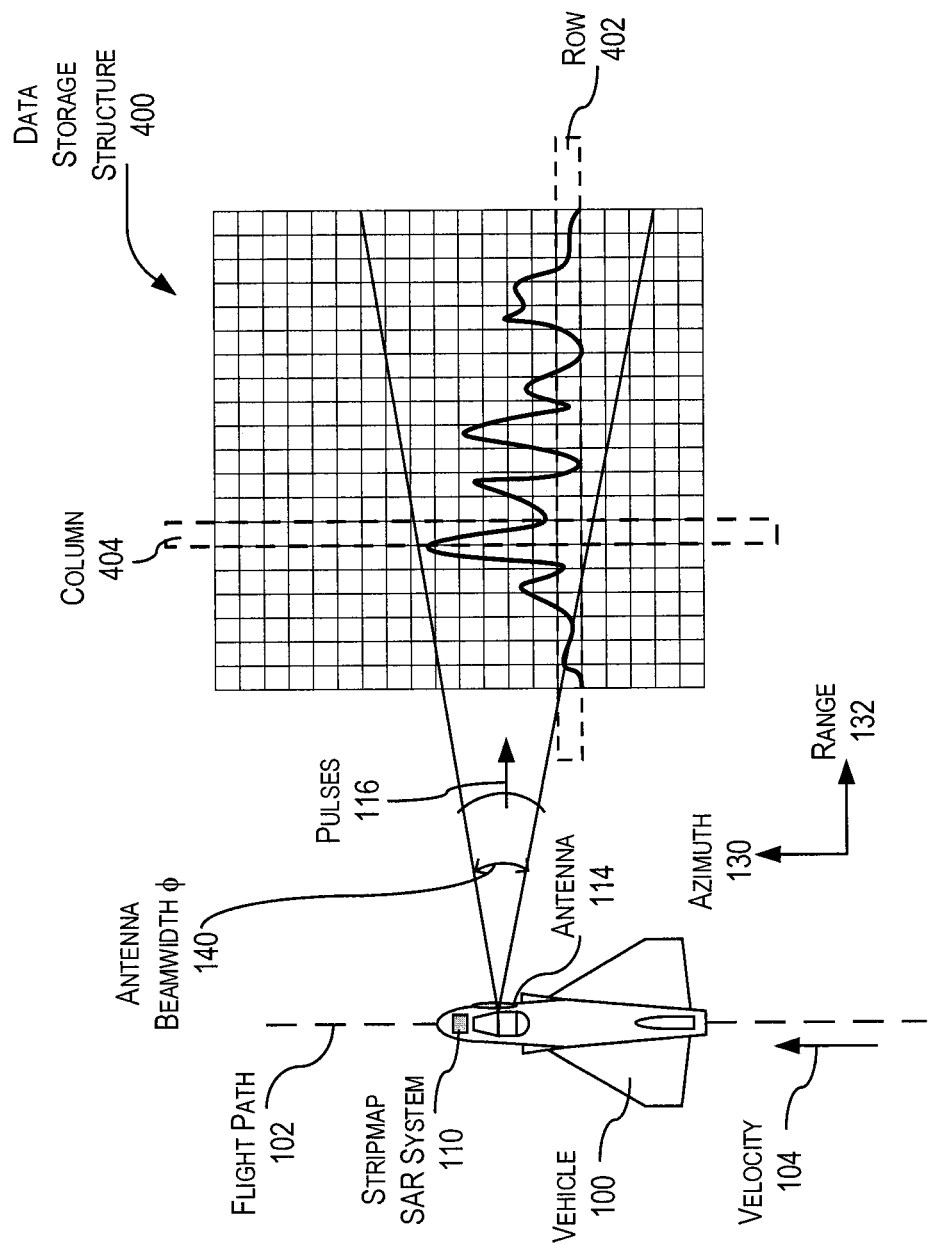
FIG. 4 is a system diagram of an example of an implementation of a data storage structure, of the SAR system shown in FIG. 2, for radar return signals from successive transmitted SAR radar signal pulses in accordance with the present disclosure.

In FIG. 4, a system diagram is shown of an example of an implementation of a data storage structure 400 (of the stripmap SAR system 200) for the radar return signals 138 from successive transmitted SAR radar signal pulses 116 in accordance with the present disclosure. In this example, the data storage structure 400 is shown as a grid data structure having rows along the azimuth direction (e.g., the along-track direction 130) and columns along the range direction (e.g., the across-track direction 132). In this example, the data storage structure 400 is in the storage 206.

In an example of operation, the discrete samples of the radar return signals 138 are recorded and stored in the data storage structure 400. Each row 402 of the data storage structure 400 contains the discrete samples of a radar return signal (from the radar return signals 138) from a single transmitted SAR radar signal pulse from the SAR radar signal pulses 116. The next row up contains samples of the radar return signal from the next transmitted SAR radar signal pulse, and so on. As such, the signal samples stored along a given column 402 constitute an "induced azimuth signal." A significant portion of the processing described in this disclosure is applied to this induced azimuth signal that is generally referred to as simply the "azimuth signal."

Figure 5:
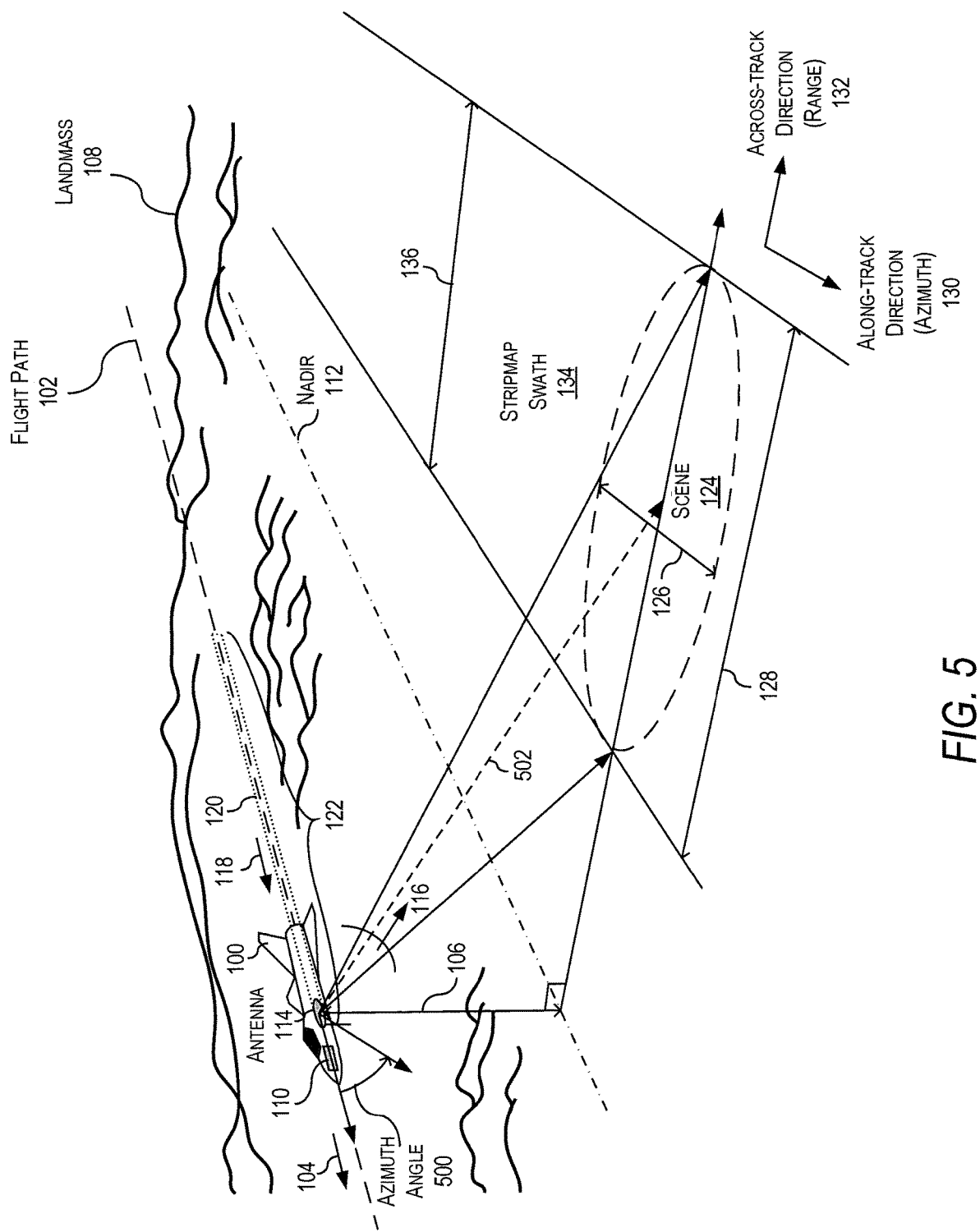
FIG. 5 is a system diagram of an example of an implementation of azimuth signal processing to decompose the radar signal by look angle in accordance with the present disclosure.

In FIG. 5, a perspective view of a diagram related to the diagram shown in FIG. 1A is shown in accordance with the present disclosure. In this example, an azimuth angle 500 is shown for the stripmap SAR system 200. The azimuth angle 500 is related to a line of sight (LOS) 502 for the stripmap SAR system 200, where the LOS 502 is a line between the boresight of the antenna 114 and a point within the scene 124 on the stripmap swath 134. The azimuth angle 500 is equal to an angle between the flight path 102 (e.g., the azimuth direction along the along-track direction 130) and a projection of the LOS 502 to a plane defined by the along-track direction 130 (e.g., the azimuth direction) and the across-track direction 132 (e.g., the range direction).

In this disclosure, the stripmap SAR system 200 performs navigation by matching the observed scenes (e.g., scene 124) against saved reference template scenes in the storage 206. The stripmap SAR system 200 matches the observed scenes against the saved reference template scenes by utilizing a method that provides techniques for matching and registration of the SAR phase history data, for example, to estimate geometric transformations of the data with respect to the reference template scenes. In this example, the SAR phase history data of the scene 124 is converted to a range profile domain and compared to a range profile of a template of the same scene to provide for efficient SAR-based navigation. It is appreciated that in this example, that the scene data 124 is not processed to reconstruct any images and that the conversion to range profile domain (and other processing noted below) is not the same as the processing that would be required for image reconstruction.

The method may also include utilizing a p-Wasserstein distance metric sub-method to improve the convergence on the registration parameters associated with the method that will be described later in the present disclosure. Moreover, the method includes utilizing an integral transform such as, for example, the Radon transform; however, mathematically the Radon transform is an integral transform that produces a projection of data from an input function having a density. The projection of data is produces as an output of a tomographic scan that is a combination of a series of images taken from different angles around and object or scene that is being scanned. As a result, the data input into this method needs to be data that would be obtained by scanning the scenes (e.g., scene 124) from different angles such as, for example, in a spotlight or circular mode SAR that provide range profile measurements for multiple look angles that are leveraged by the matching procedure of the method.

Since a standard stripmap mode SAR measures range profiles only for a single fixed look angle of the antenna, the standard stripmap mode SAR is not capable of producing range profiles from different angles. The stripmap SAR system 200 address this problem by utilizing a range-profile processing sub-method that extracts partial or piecewise circular SAR range profile data from the single-look stripmap range profile to transform the received stripmap range profile data (or phase histories) into partial circular range profile data to allow the utilization of the range-profile based matching method described in the present description.

Figures 6A, 6B:
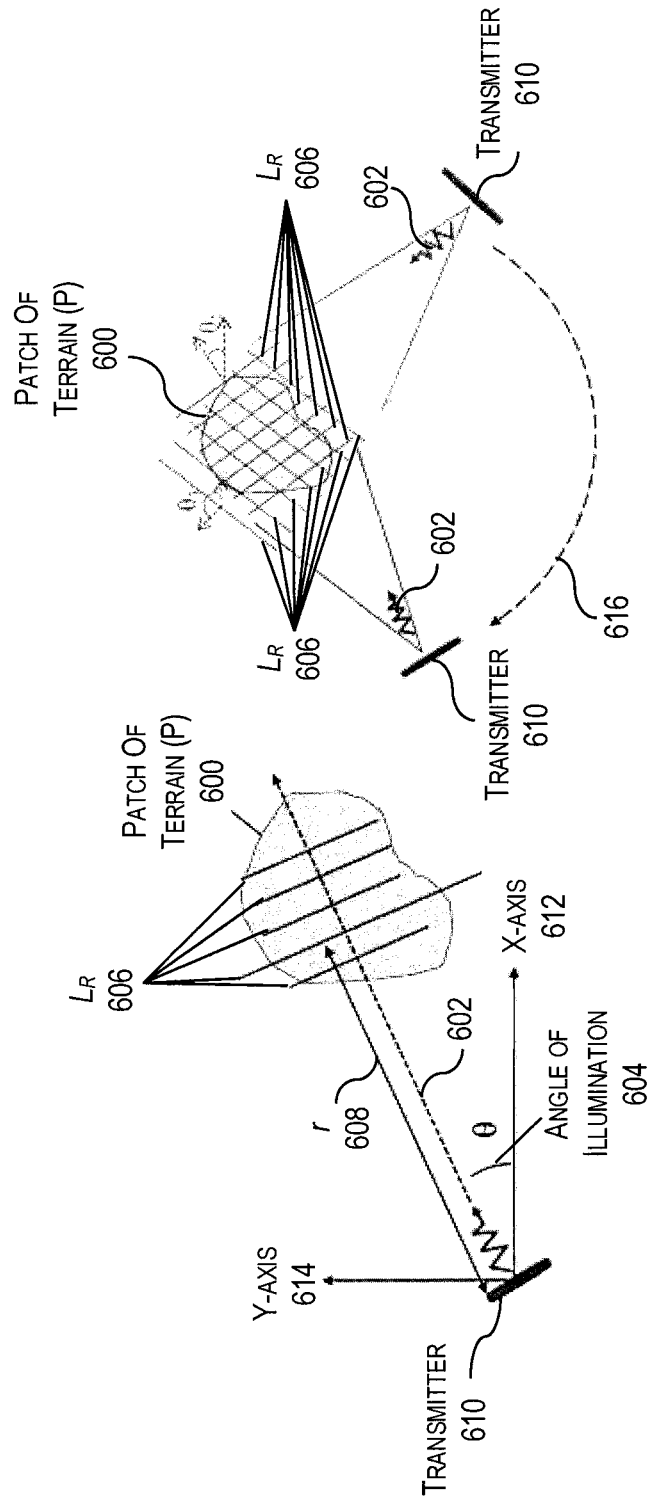
FIGS. 6A and 6B are graphical representations of generating a line integral of the reflectivity of a patch of terrain in accordance with the present disclosure.

Turning to FIGS. 6A and 6B, a graphical representation of generating a line integral of the reflectivity of a patch of terrain is shown in accordance with the present disclosure. As an example of the matching method, a radar return signal (e.g., from radar return signals 138) from a patch of terrain P 600 (e.g., scene 124) that has reflectivity f(x,y) and is illuminated 602 at an angle θ 604, is defined as having the following relationship (1):

$$J(r,\theta) = \iint_{(x,y)\in P} f(x,y)\delta(L_R)dxdy,$$

where J(r, θ) is a line integral of the reflectivity along lines $L_R$ 606 for each range r 608 (e.g., distance) from a transmitter 610 as shown in FIGS. 6A and 6B. In this example, $L_R = r - x \cos\theta - y \sin\theta$, and $\delta(L_R)$ is a Dirac's delta function. In this example, the illuminating angle θ 604 is along a plane defined by the X-axis 612 and Y-axis 614. The radar return signals are generated by illuminating the patch P 600 from successive illuminating angles θ 604 by circling 616 the transmitter 610 around the patch P 600 as shown in FIG. 6B.

The radar return signals are generated by illuminating the patch P 600 from successive illuminating angles θ 604 by circling 616 the transmitter 610 around the patch P 600 as shown in FIG. 6B. The generated radar return signals are generated as a two-dimensional data set of SAR range profiles defined by J(r, θ). Therefore, by using this process, the circular mode SAR range profile data is generated, which is mathematically equivalent to the Radon transform.

In FIGS. 7A and 7B, graphical depictions of an image 700 and a Radon transform 702 of the image 700 are shown in accordance with the present disclosure. In this example, typical geometric transformations that are needed to match an observed image with a template, namely rotation, translation, and scaling, have mathematically traceable counterparts in Radon space, where an image space operation of rotation of ϕ degrees corresponds to a Radon space of J(r, θ−ϕ). Similarly, an image space operation of translation by $(x_0, y_0)$ corresponds to a Radon space of $J(r-x_0 \cos\theta - y_0 \cos\theta)$. Moreover, an image space operation of scaling by a value α corresponds to a Radon space of αJ(αr, θ).

As such, if two images $I_1$ and $I_0$ are related to each other via a set of these three transformations, then their Radon transforms are related to each other according to relationship (2)

$$J_1 = \alpha J_0(\alpha(r - x_0 \cos\theta - y_0 \sin\theta), \theta - \phi).$$

This allows the method of the present disclosure to estimate the registration parameters α, $(x_0, y_0)$ and ϕ directly in Radon space, specifically in range profile space, bypassing any image reconstruction process. The registration is achieved between a pre-stored range profile template $J_0$ and observed range profiles $J_1$ by minimizing the p-Wasserstein distance between them.

Utilizing this method, the stripmap SAR system 200 does not need the entire range of angles of the Radon transform to achieve registration. When observations are for sparse or limited range of angles, registration can still be achieved. Since the stripmap SAR system 200 can extract a partial circular SAR from spotlight SAR data with a range adjustment, the method works in spotlight mode SAR as well.

Figure 8B:
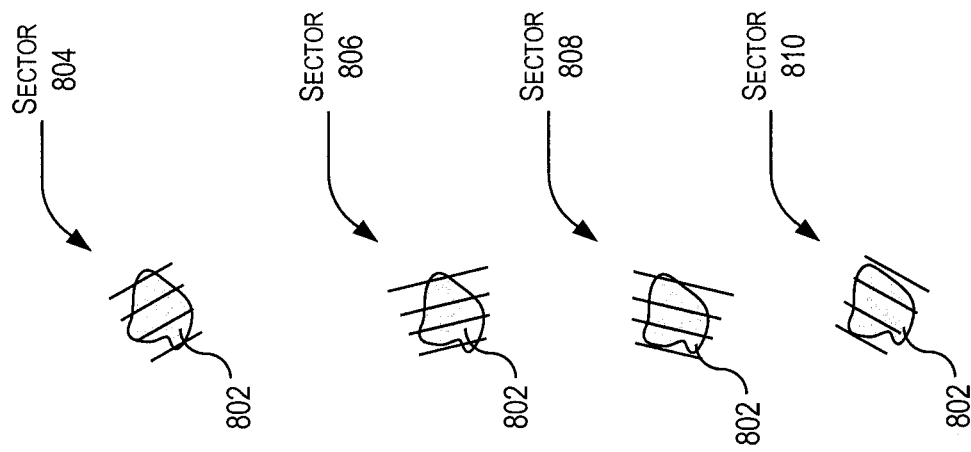
FIGS. 8A and 8B are graphical representations of an example of an implementation of virtual sectors of a main beam of the antenna, of the stripmap SAR system shown in FIG. 2, illuminating a patch of terrain at different observation angles in accordance with present disclosure.
Figure 8A:
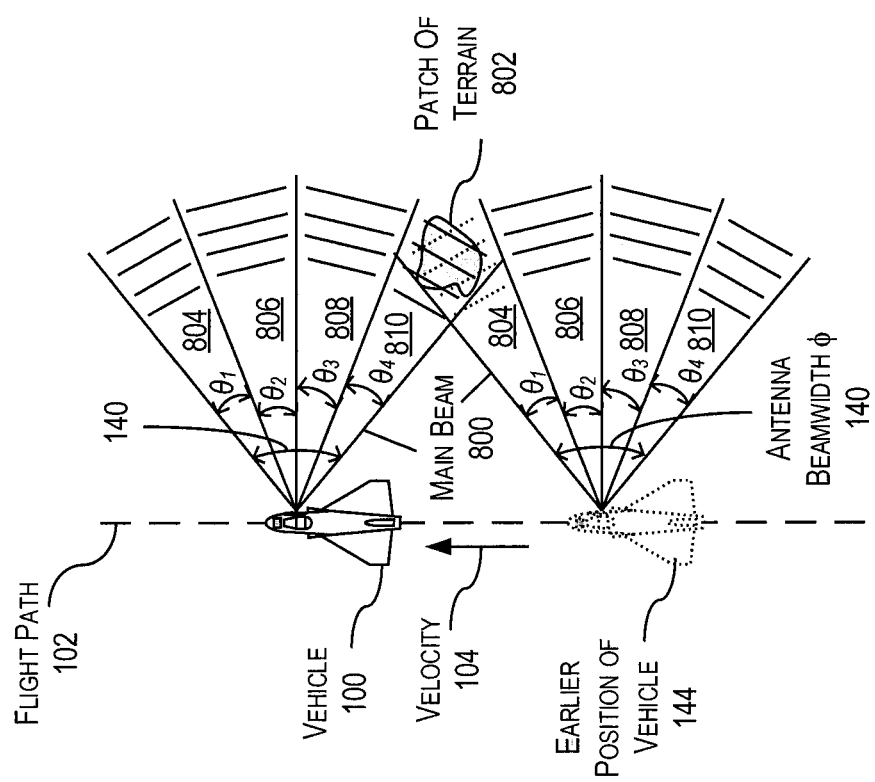

In FIGS. 8A and 8B, graphical representations are shown of an example of an implementation of virtual sectors of the main beam 800 of the antenna 114, of the stripmap SAR system 200, illuminating a patch 802 of terrain at different observation angles in accordance with present disclosure. In this example, the stripmap SAR system 200 decomposes each of the radar return signals 138 into components corresponding to different sectors of the beamwidth 140 of the main beam 800 of the antenna 114, effectively making it possible to extract range profiles corresponding to different illumination angles $\theta_i$ (e.g., $\theta_1$, $\theta_2$, $\theta_3$, and $\theta_4$) within the beamwidth 140. The different illumination angles $\theta_1$, $\theta_2$, $\theta_3$, and $\theta_4$ define corresponding different angle sectors 804, 806, 808, and 810 of the main beam 800. These signal components can be transformed and combined in such a way as to construct range profiles equivalent to a partial circular SAR, which can then be utilized as inputs to the Radon transform based method for performing registration in range profile space without the need to construct an image.

As an example, as a main beam 800 sweeps past a scattering feature of the patch 802 of terrain, it illuminates the patch 802 from different look angles even though the antenna 114 is always pointed in the same fixed direction, as illustrated in FIGS. 8A and 8B. In this example, the different look angles correspond to the different illumination angles $\theta_1$, $\theta_2$, $\theta_3$, and $\theta_4$ of the angle sectors 804, 806, 808, and 810 of the main beam 800. In operation, the most forward sector of the main beam 800 (e.g., sector 804) illuminates the patch 802 first, followed by sectors 806, 808, and 810. Because the distance from the antenna 114 to the scatterer (e.g., patch 802) changes from one sector of the main beam 800 to the next, a Doppler shift is induced in the azimuth signal. This Doppler frequency may be mathematically mapped to an angle. In this example, the stripmap SAR system 200 may include a set of bandpass filters to extract the different Doppler components from the azimuth signal and assigns the different Doppler components to the different sectors of the main beam 800. This is equivalent to segregating the radar return signals 138 by angle of arrival, or equivalently, by illumination angle. Further processing applies various range adjustments and sums these signals to produce the equivalent circular SAR range profiles, which can then be used by the registration method for matching with a template.

Figure 9:
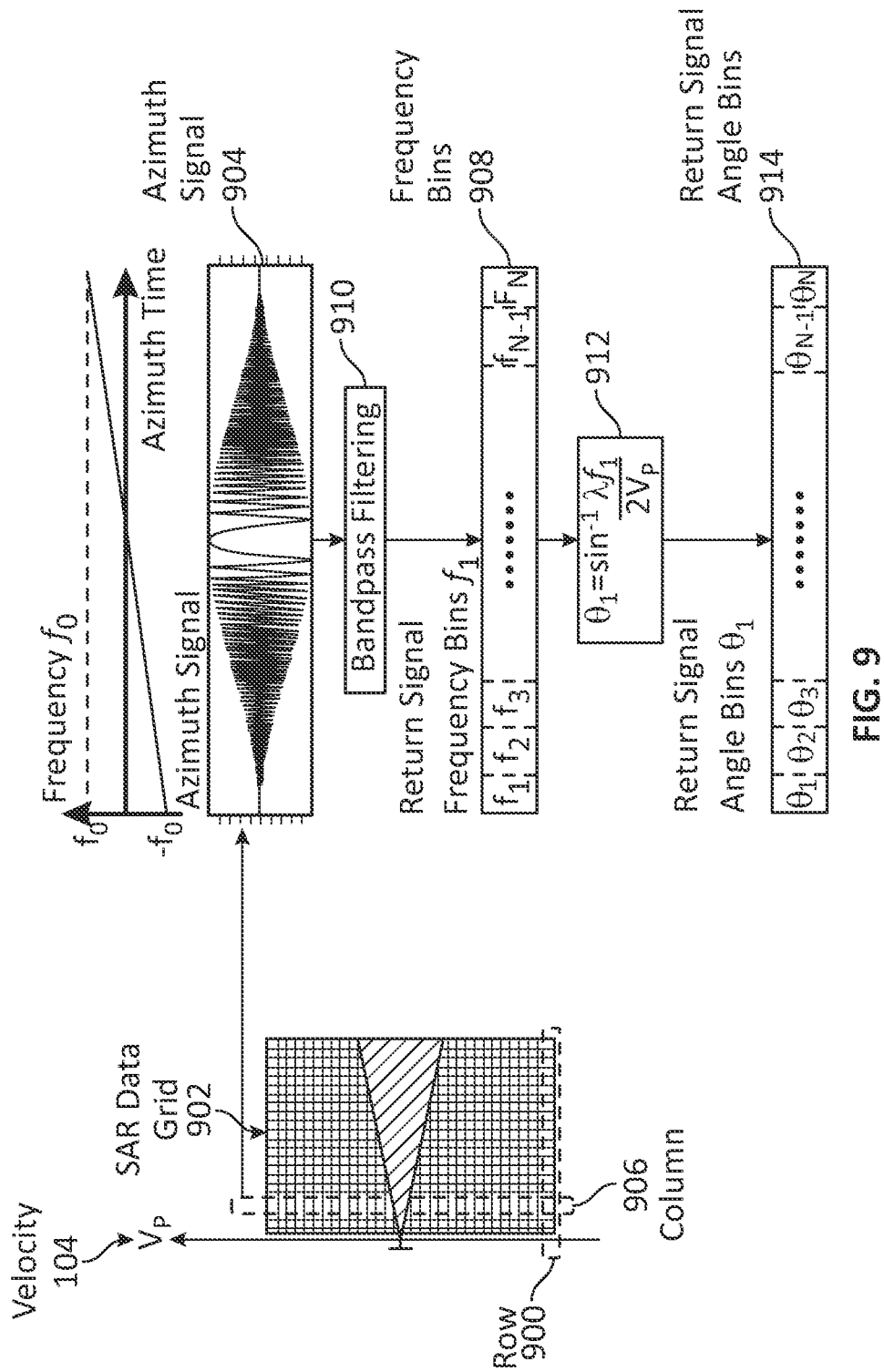
FIG. 9 is a system diagram of an example of an implementation of azimuth signal processing to decompose the radar return signals by look angle in accordance with the present disclosure.

Turning to FIG. 9, a system diagram is shown of an example of an implementation of the azimuth signal processing method to decompose the radar return signals 138 by look angle in accordance with the present disclosure. As an example, at least portions of the azimuth signal processing method disclosed with respect to FIG. 9 can be implemented by the stripmap SAR system 200. As samples of each new return pulse (of the radar return signals 138) are written onto a new row 900 of a SAR data grid 902, induced azimuth signals 904 develop along each column 906. In this example, individual scattering points on the terrain generate azimuth signals which look like chirp signals, quasi-linearly sweeping Doppler frequency f from $-f_0$ to $+f_o$, as shown in FIG. 9. Each Doppler frequency f corresponds to an angle θ via the relationship (3):

$$\theta = \sin^{-1} \frac{\lambda f}{2V_p},$$

where λ is the center wavelength of the antenna 114 and $V_p$ (e.g., velocity 104) is the velocity of the radar platform (e.g., the vehicle 100). The frequency spectrum is divided into N frequency bins 908 and time-domain bandpass filtering 910 is applied to the azimuth signal 904 to extract components corresponding to each frequency bin 908. The method then utilizes relationship (3) 912 to determine the radar return signal angle that is saved in radar return signal angle bins 914. As such, each frequency component is mapped onto a look angle according to relationship (3), thus separating the radar return signals by angle of illumination and/or arrival.

It should be noted that the azimuth signal 904 may be first shifted by some frequency $f_v$ onto the range $f_v$ to $(f_v+2f_o)$ for easier bandpass filtering 910. This method is applied to each azimuth data column 906 in the SAR data grid 902. A range adjustment is then applied to each signal component in order to map the SAR range profile data onto a Radon transform (equivalent to circular SAR).

Figure 10:
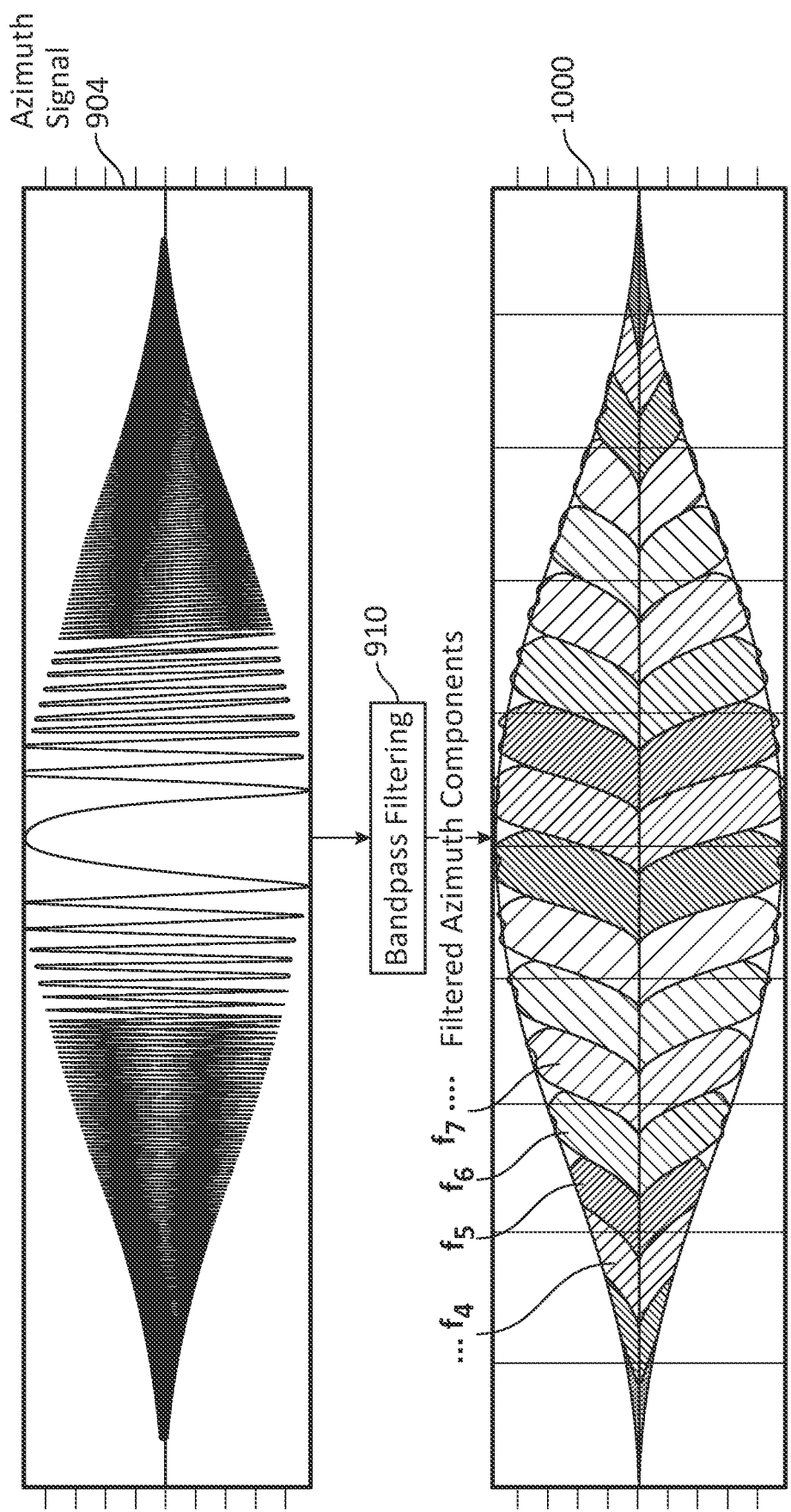
FIG. 10 is a system diagram of an example of an implementation of azimuth signal bandpass filtering in accordance with the present disclosure.

In FIG. 10, a system diagram is shown of an example of an implementation of azimuth signal 904 bandpass filtering 910 in accordance with the present disclosure. In this example, FIG. 10 illustrates the filtered frequency components (e.g., filtered azimuth components 1000) of the azimuth signal 904 superimposed on the same graph.

Figure 11:
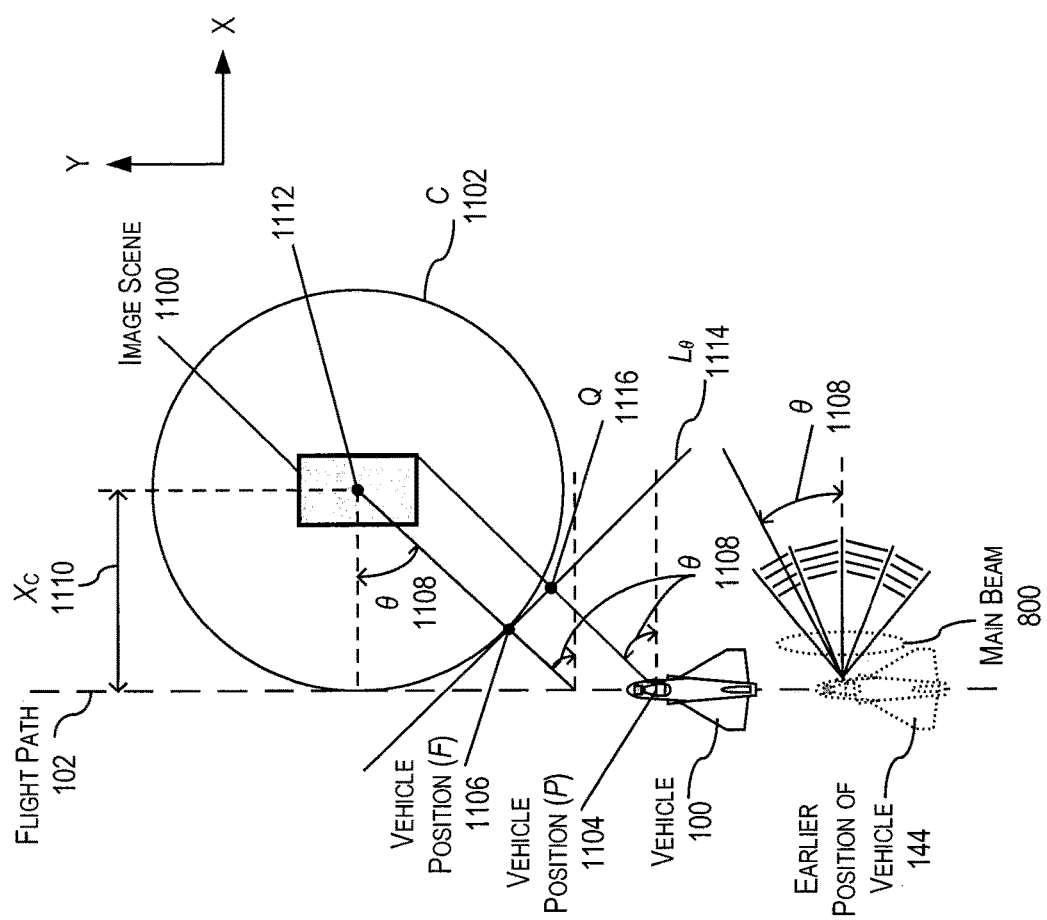
FIG. 11 is a system diagram of an example of an implementation of a geometrical adjustment for mapping the stripmap ranges to circular SAR ranges in accordance with the present disclosure.

FIG. 11 is a system diagram of an example of an implementation of a geometrical adjustment for mapping the stripmap ranges to circular SAR ranges in accordance with the present disclosure. In this example, the geometrical adjustment is a range adjustment to transform the stripmap SAR range profiles into equivalent circular SAR range profiles that may be utilized by a Wasserstein-based registration method.

In this example, the straight flight path 102 is shown. Also shown is an imaged scene 1100 and a virtual circular SAR flight path (C) 1102 onto which the stripmap ranges are to be mapped. Moreover, in this example, P 1104 is the vehicle 100 position/location along the flight path 102 with coordinates $(x_p, y_p)=(0, \eta V_p)$, where η is the time such that it is zero when $y_p=0$. F 1106 is the point on the virtual circular SAR flight path C 1102 corresponding to look angle θ 1108 (e.g., the beam sector look angle). Its coordinates are $$x_F=(1-\cos \theta)X_c$$

$$y_F=-\sin \theta X_c$$

where $X_C$ 1110 is the down range distance to the center 1112 of the imaged scene 1100. $L_\theta$ 1114 is the line going through F 1106 and tangent to the virtual circular SAR flight path C 1102 that corresponds to the range projection line for the circular SAR equivalence. Q 1116 is the perpendicular projection of the vehicle 100 location P 1104 onto this range referencing line $L_\theta$ 1114. Its coordinates are $$x_Q=\cos^2 \theta[(y_F-y_P)\tan \theta+x_F]$$

$$y_Q=y_P+x_Q \tan \theta$$

The line PQ is then the distance by which each stripmap range, corresponding to look angle θ 1108 and vehicle 100 location P 1104, has to be adjusted to be equivalent to the circular SAR range for flight path C 1102.

Utilizing these processing methods produces signals for each look angle $\theta_i$ with range adjusted to be equivalent to circular SAR. The amplitudes of these signals are then summed to produce the Radon transform data grid, which is a two-dimensional (2D) array of circular SAR range vs look angle.

In this example, the stripmap SAR system 200 may optionally filter the azimuth signals 904 with a Butterworth bandpass frequency filter. An advantage of this approach is that filtering can be done continuously in real-time as new data is coming into the stripmap SAR system 200, because only a short window of a few successive return pulses is needed to apply the Butterworth filter. However, it is appreciated that any other filtering method, even hardware-based ones may be used, depending on what is optimal for a particular stripmap SAR system 200.

Figure 12:
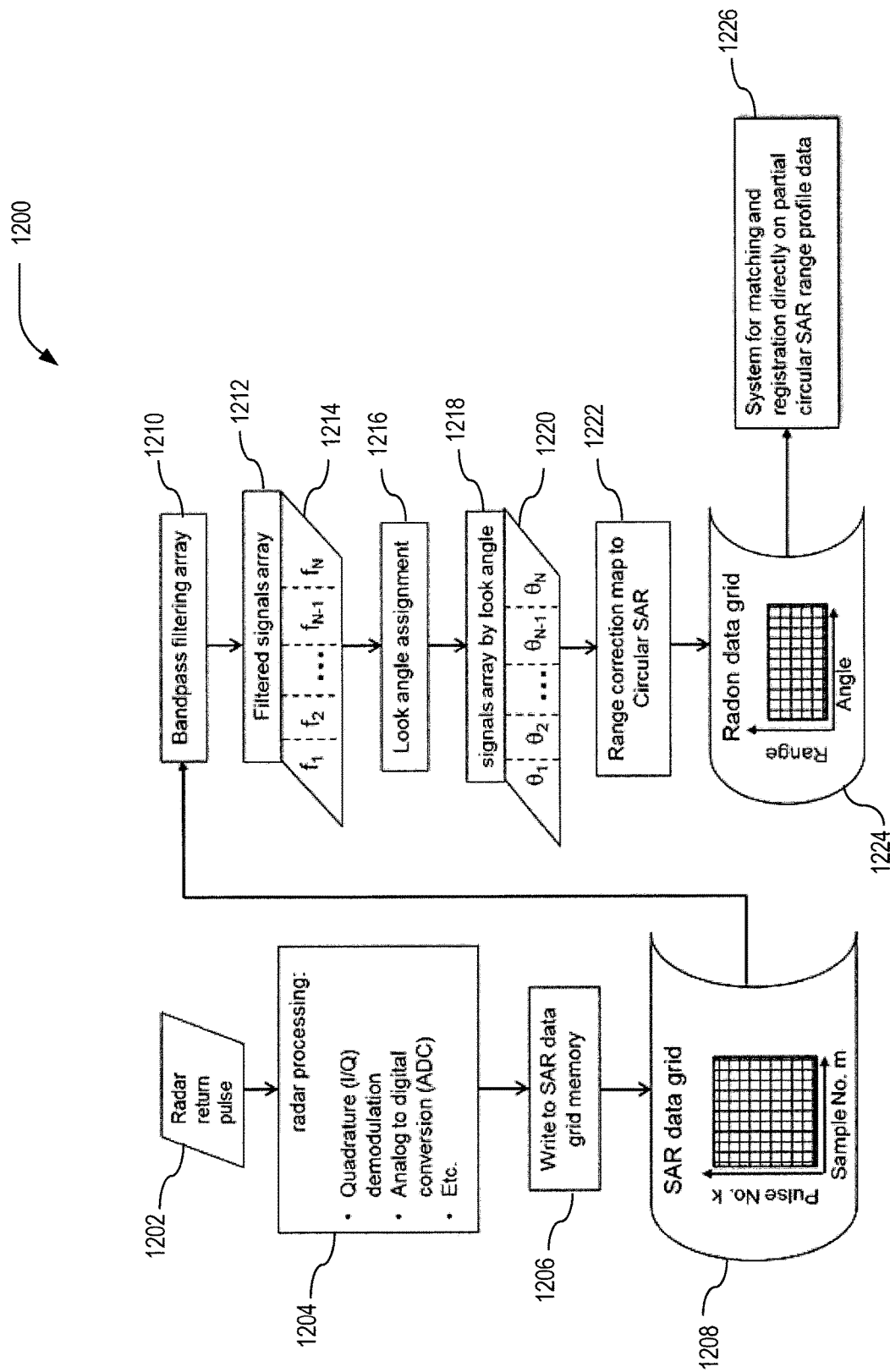
FIG. 12 is a flowchart of a method performed by the stripmap SAR system of FIG. 2 in accordance with the present disclosure.

Turning to FIG. 12, a flowchart is shown of a method 1200 performed by the stripmap SAR system 200 in accordance with the present disclosure. The method 1200 starts by the stripmap SAR system 200 receiving 1202 the radar return pulse (of the radar return signals 138) and then the performing radar processing 1204. The radar processing 1204 may include quadrature demodulation, analog-to-digital conversion, and other sub-processes. The resulting processed signals are written 1206 to the SAR data grid 902 in a memory (e.g., storage 206) 1208. The resulting azimuth signal 904 data is then bandpass filtered 1210 through a bandpass filtering array and the filtered signals that extracted components of the azimuth signal 904 are stored 1212 in corresponding frequency bins 1214. The data is transformed in look angles with a look angle assignment method 1216 to produce a signal array of look angles that are stored 1218 in corresponding angle bins 1220. The data is then range adjusted 1222 to process with a Radon transform. The Radon transform is applied 1224 to produce a Radon data grid range values versus look angle. The stripmap SAR system 200 then matches and registers 1226 directly on the partial circular SAR range profile data.

FIGS. 13A-13C are a comparison of three images ranges in accordance with the present disclosure. FIG. 13A is a terrain image 1300 with 5 scattering points 1302, 1304, 1306, 1308, and 1310. FIG. 13B is a partial Radon transform 1312 of range values versus look angle computed by the present disclosure directly from the stripmap SAR range profiles corresponding to the terrain image shown in FIG. 13A in accordance with the present disclosure. FIG. 13C is a direct Radon transform 1314 from FIG. 13A in accordance with the present disclosure. In this example, a beamwidth 140 of 60° is utilized for the partial Radon transform 1312 shown in FIG. 13B so the range angles are −30° to 30°. With regard to FIG. 13C, the Radon transform 1314 is computed directly from the image 1300 for angles −30° to 30°.

From FIGS. 13B and 13C, it is appreciated that the stripmap SAR system 200 may compare an observed scene 124 against a template scene without having to reconstruct any images and do any image processing. The comparison is done by comparing the range profiles of the observed scene 124 against the template scene.

Figures 15A, 15B:
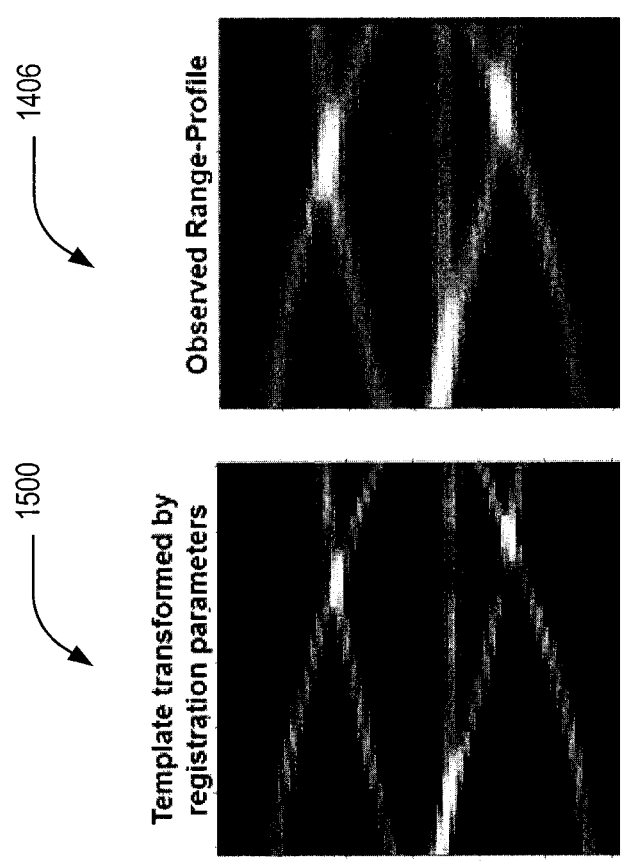
FIGS. 15A and 15B are images of a successfully matched and registered template and observed images shown in FIGS. 14A-14C in accordance with the present disclosure.

FIGS. 14A-14C are another comparison of four images in accordance with the present disclosure. In FIG. 14A, an observed image 1400 and template image 1402 are rotated and translated with respect to each other. In this example, the template image 1402 may be warped by rotation and/or translation. Both the observed image 1400 and template image 1402 may include a plurality of features. In FIG. 14B, a Radon transform 1404 of range-profiles of the template image 1402 is shown in accordance with the present disclosure. FIG. 14C is a Radon transform 1406 derived from the observed stripmap SAR range profiles of the observed image 1400 in accordance with the present disclosure. In this example, the image of the first Radon transform 1404 and the second Radon transform 1406 are similar but do not match. However, the registration and matching methods of the present disclosure solves this problem by using the two Radon transforms 1404 and 1406 to find the rotation and translation parameters needed to make the Radon transform 1404 of the template match the Radon transform of the observation 1406. Turning to FIGS. 15A and 15B, a template image 1500 transformed by the registration parameters is shown to successfully match the Radon transform 1406 of the observed image 1400. In this example, the method found the correct rotation and translation parameters to apply to the warped template 1404 to match the observed range profiles.

Figure 16:
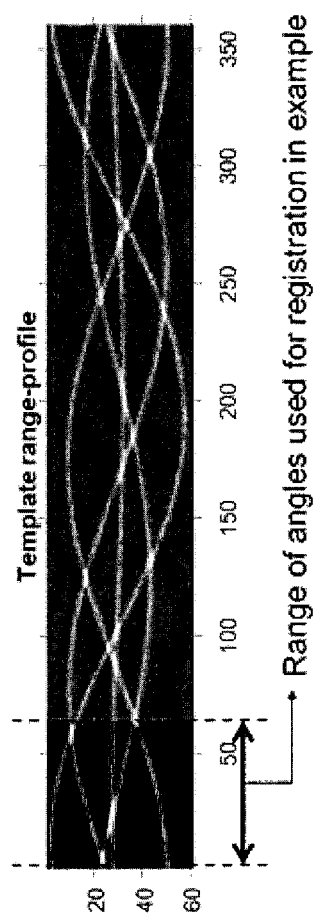
FIG. 16 is an image that shows that successful registration can be achieved with limited range of Radon transform angles in accordance with the present disclosure.

It is noted that the stripmap SAR system 200 is configured to achieve matching and registration using only a limited range of angles for the Radon transform as shown in FIG. 16. The range of angles corresponds to the beamwidth 140 of the antenna 114 because, in general, the beamwidth 140 is the maximum range of effective illumination angles that may be obtained.

In an example of operation, the SAR image of an aerial landscape observed by the stripmap SAR system 200 can be matched to a stored template map image to achieve the function of navigation. By finding the rotation and horizontal translation of the observed SAR image that match it to the correct location on the template map image, the location and orientation of the vehicle 100 including the stripmap SAR system 200 can be found on the map. The stripmap SAR system 200 performs this function in stripmap SAR range profiles space, bypassing the expensive image reconstruction process.

Figure 17:
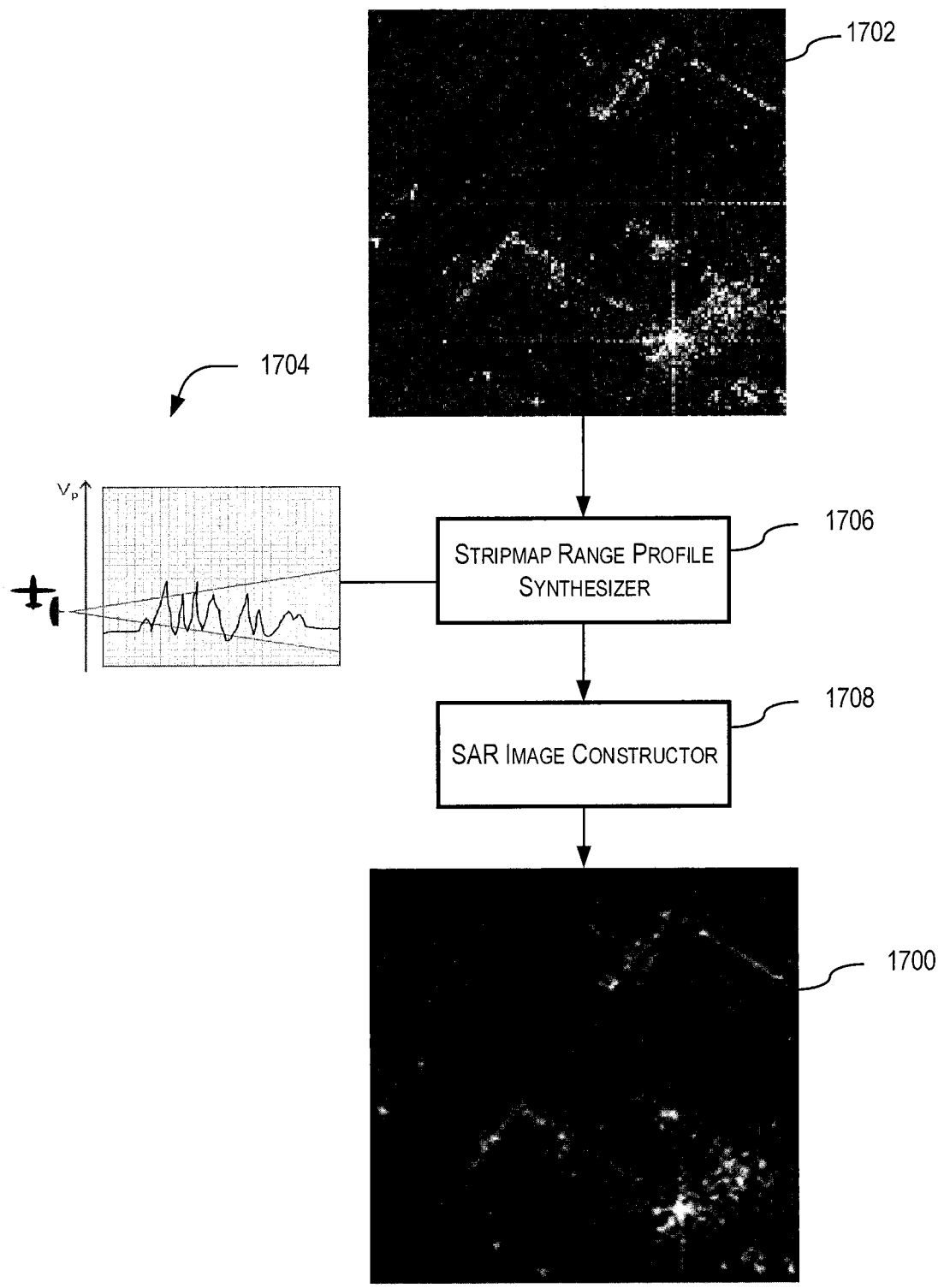
FIG. 17 is a system block diagram of an example of an implementation of the stripmap SAR system 200 producing a reconstructed SAR image from synthesized range profiles of an actual aerial SAR image in accordance with the present disclosure.

In FIG. 17, a system block diagram is shown of an example of an implementation of the stripmap SAR system 200 producing a reconstructed SAR image 1700 from synthesized range profiles of an actual aerial SAR image 1702 in accordance with the present disclosure. In this example, the stripmap SAR system 200 receives the input SAR image 1702, processes the radar return signals 138 to produce the SAR data grid 1704 and synthesize the stripmap range profile data 1706. The stripmap SAR system 200 then reconstructs the reconstructed SAR image 1700 utilizing a SAR image constructor 1708 that converts the range profiles into an image. In this example, the match of the reconstructed SAR image 1700 against the actual aerial SAR image 1702 are in good agreement and confirm that the range profiles were synthesized accurately.

Figures 18A, 18B:
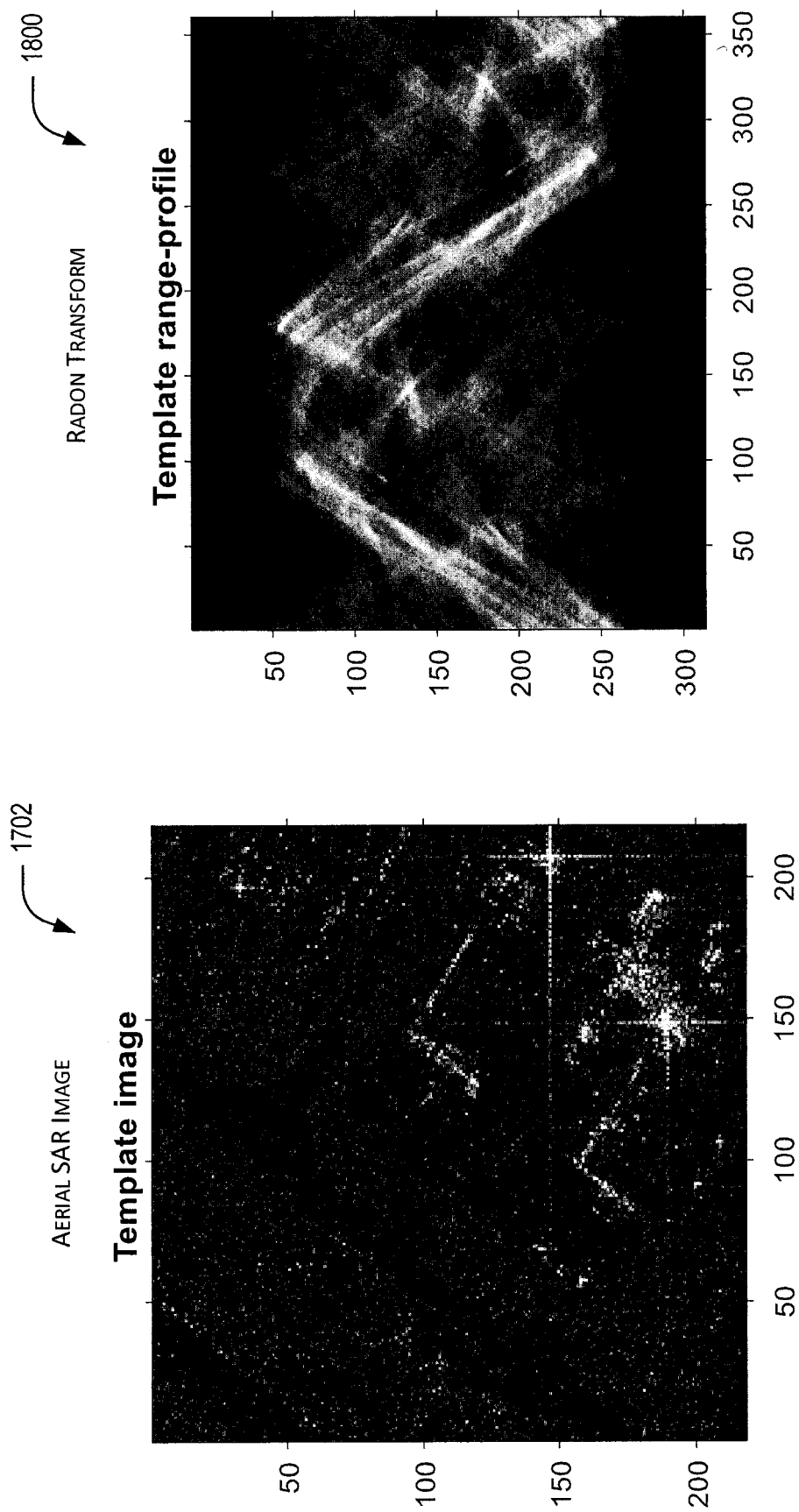
FIGS. 18A and 18B show the input aerial SAR image and a full 360° Radon transform in accordance with the present disclosure.
Figure 19B:
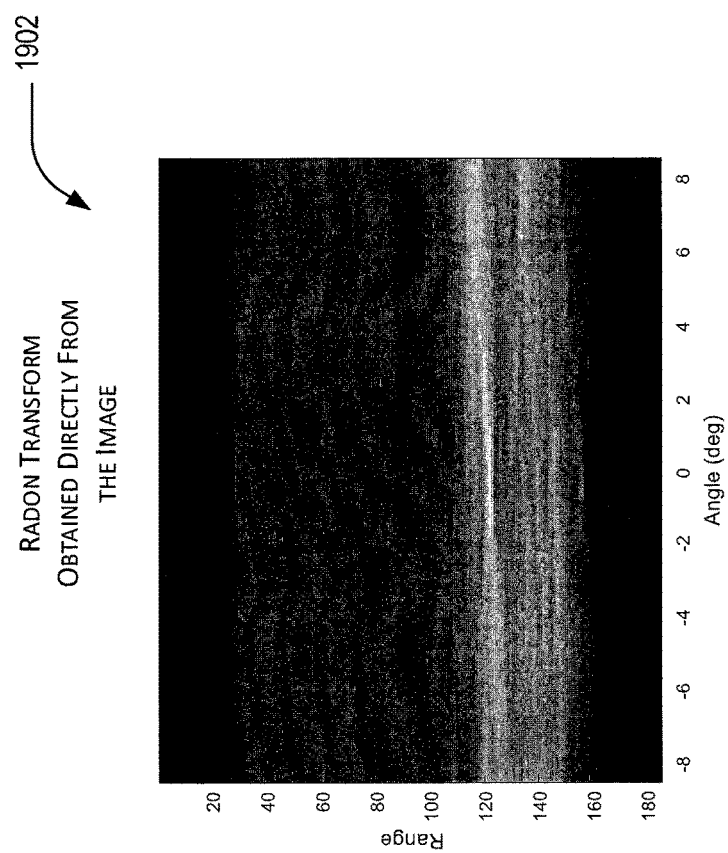
FIGS. 19A and 19B is an example of the Radon transform computed from the simulated range profiles for a 20 degree wide beamwidth using filtering that subdivides it into sectors of two degrees in accordance with the present disclosure.
Figure 19A:
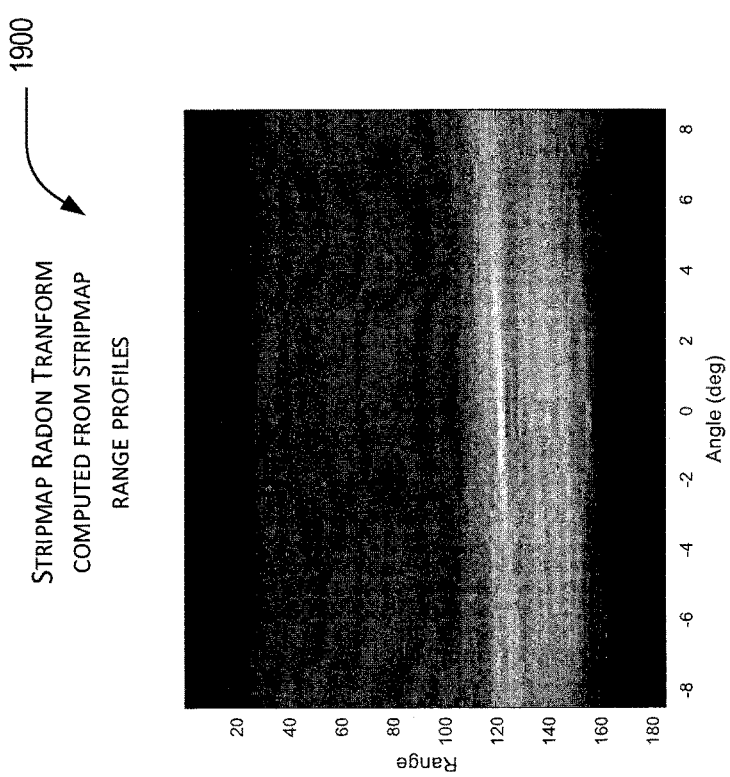
Figure 20:
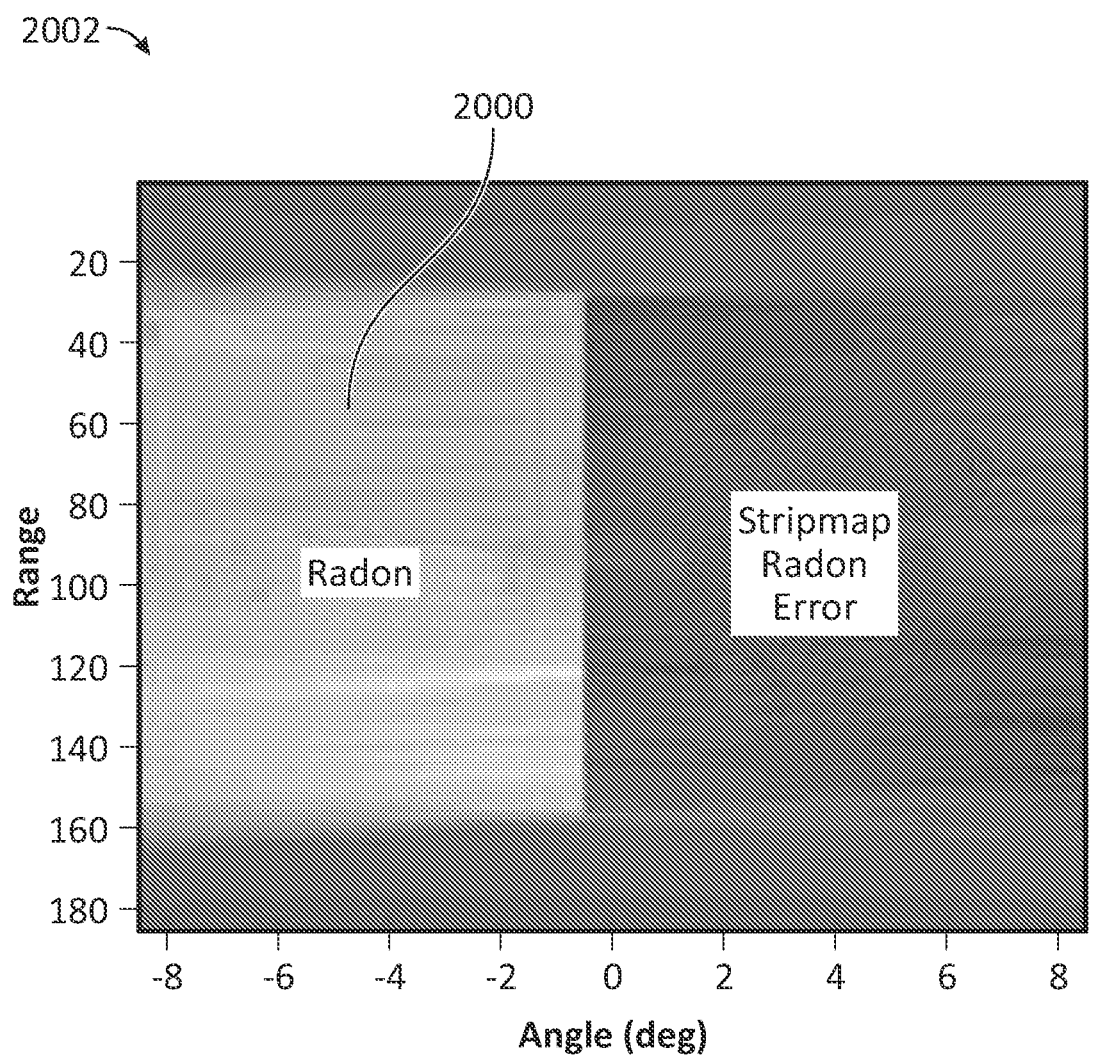
FIG. 20 shows the stripmap Radon transform computation error relative to its magnitude in accordance with the present disclosure.

For purpose of reference, in FIGS. 18A and 18B, the input aerial SAR image 1702 and a full 360° Radon transform 1800 are shown in accordance with the present disclosure. As described earlier, the stripmap SAR system 200 does not need to need to utilize the entire range of 360° angles of range profiles because a partial range of angles computed from the stripmap mode SAR range profiles produces acceptable results. As described earlier, the computed partial transform can be matched against a Radon transform template map to determine the angular and translational offsets between the radar-illuminated scene and the template map. Specifically, in FIGS. 19A and 19B, an example of a Radon transform 1900 computed from the simulated range profiles for a 20 degree wide beamwidth 140 using filtering that subdivides the beamwidth 140 into sectors of two degrees is shown in accordance with the present disclosure. The Radon transform 1902 computed directly from the aerial SAR image 1702 is shown next to it in FIG. 19B. The difference between the two methods of computing the Radon transform is shown on the right side 2000 of FIG. 20, indicating good agreement. In FIG. 20, the stripmap Radon transform 2002 computation error relative to its magnitude is shown.

Figure 21:
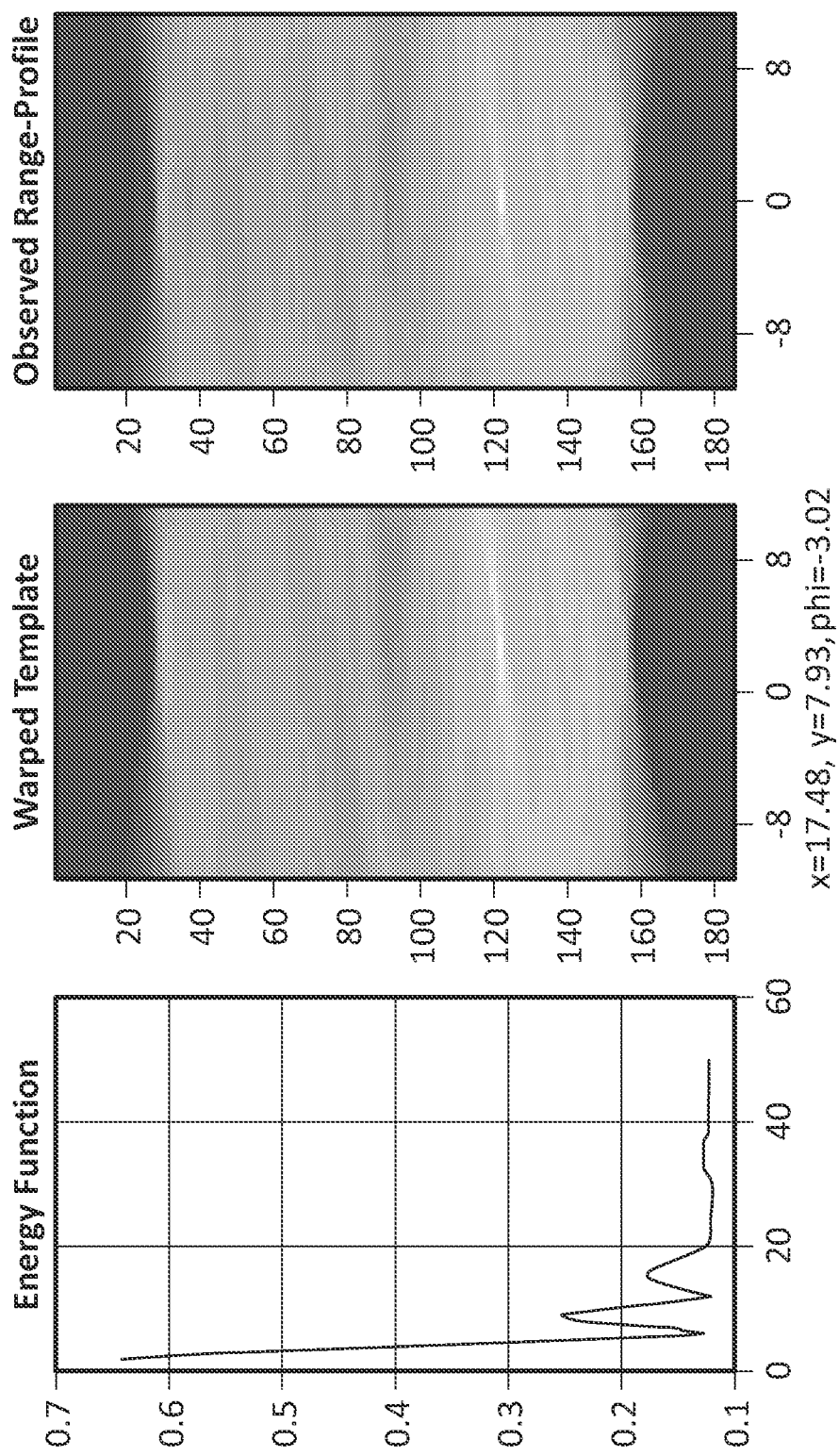
FIG. 21 shows the Wasserstein distance based registration history between stripmap Radon transform and direct-image Radon transform in accordance with the present disclosure.

The stripmap SAR system 200 may also configured to offset the template Radon transform, e.g. the map, by a translation vector of, for example, (18, 8) pixels and a rotation of three degrees. In this example, the method takes the Radon transform obtained from the stripmap range profiles and determines the offset with respect to the template map accurately to within about half a pixel for translation and $\frac{1}{50}^{th}$ of a degree for rotation. The convergence history of this example method, e.g. the offset energy function 2100, is shown in FIG. 21, which shows the Wasserstein distance based registration history between stripmap Radon transform 2102 and direct-image Radon transform 2104.

In this disclosure, it is appreciated by those or ordinary skill in the art that the Wasserstein distance is a suitable measure for comparing probability distributions because it takes into account the distance between sparse spikes by taking the difference of the cumulative sparse distributions. In general, the Wasserstein distance (also known as the Wasserstein metric or Kantorovich-Rubinstein metric) is a distance function defined between probability distributions on a given metric space.

A p-Wasserstein distance is used as the metric for registration that provides a smooth energy landscape, and a gradient descent optimization is used to estimate the geometric transformations based on the p-Wasserstein distance.

As an example, the stripmap SAR system 200 described herein may rely on observed range profile data of a scene and the range profile data of a SAR template of the same scene (e.g., a template range profile data) may be used to compare to the observed range profile data. A p-Wasserstein distance corresponding to the observed range profile data with respect to the template range profile data is calculated and gradient descent optimization is performed based on the p-Wasserstein distance to estimate a rotation angle, scaling, and a translation of the observed range profile data with respect to the template range profile data of the scene.

In the present disclosure, the stripmap SAR system 200 is configured to utilize and leverage the smoothness characteristic of p-Wasserstein distances, where the stripmap SAR system 200 can recover the registration parameters from an under sampled SAR phase history data in few iterations, reducing the sensing requirements of the stripmap SAR system 200 by a factor, for example, of twenty-five to one hundred times. Further, by reducing the sensing, computation, memory, and transmission requirements of the navigation function, the stripmap SAR system 200 enables SAR-based navigation to be deployed on platforms with limited computational power and low SWaP.

As an example, the one or more processing units 210 may be adapted to compare an observed range profile data to a template range profile data of the same scene. In this regard, one or more processing units 210 may calculate a p-Wasserstein distance corresponding to the observed range profile data with respect to the template range profile data. The p-Wasserstein distance is formulated as a p-Wasserstein loss function for the registration parameters. In some examples, the registration parameters include one of a rotation angle, a scaling, or an x, y translation of the observed range profile data relative to the template range profile data.

The one or more processing units 210 may be adapted to estimate registration parameters associated with the observed range profile data relative to the template range profile data. In this regard, the one or more processing units 210 performs a gradient descent optimization based on the p-Wasserstein distance. In various examples, the gradient descent optimization includes one of a dual formulation of the optimization or a primal formulation of the optimization or a combination thereof. In some examples, estimation of the registration parameters is based on numerous iterations (e.g., a plurality) to calculate the p-Wasserstein distance and perform the gradient descent optimization based on the p-Wasserstein distance.

In general, the stripmap SAR system 200 comprises a memory, one or more processing units, and machine-readable medium on the memory. The machine-readable medium stores instructions that, when executed by the one or more processing units, causes the stripmap SAR system 200 to perform various operations. These operations comprise: receiving stripmap range profile data associated with observed views of a scene; transforming the received stripmap range profile data into partial circular range profile data; comparing the partial circular range profile data to a template range profile data of the scene; and estimating registration parameters associated with the partial circular range profile data relative to the template range profile data to determine a deviation from the template range profile data.

In this example, the received stripmap range profile data may be stored in a data grid structure within a storage. Additionally, the transforming the received stripmap range profile data into the partial circular range profile data may comprise: decomposing the stripmap range profile data into components corresponding to different sectors of an antenna beam of an approximately normal positioned antenna having a defined beamwidth; extracting angular range profile data corresponding to different illumination angles within the defined beamwidth; and range adjusting the angular range profile data to produce the partial circular range profile data.

In this example, the extracting may comprise: extracting Doppler components for stripmap range profile data; and assigning the extracted Doppler components to the different sectors of the antenna beam. Moreover, the decomposing may comprise determining an azimuth signal; and the extracting the partial circular range profile data comprises: bandpass filtering the azimuth signal to produce a plurality of return signal frequency bins; determining a Doppler angle for each return signal frequency of the plurality of return signal frequency bins; and storing the Doppler angle for each return signal frequency in a return signal angle bin corresponding to the angular range profile data. Furthermore, the range adjusting may comprise geometrically transforming the angular range profile data into the partial circular range profile data.

Still further, in this example, the comparing may comprise calculating a Wasserstein distance corresponding to the range profile data with respect to the template range profile data; and the Wasserstein distance identifies a global minimum of one or more of the registration parameters. The Wasserstein distance may comprise a p-Wasserstein distance or a 2-Wasserstein distance. The estimating may comprise performing a gradient descent improvement based on the Wasserstein distance to estimate one or more of the registration parameters. Moreover, the Wasserstein distance, based on one or more of the registration parameters, may comprise a smooth energy landscape with a single global minimum corresponding to values for one or more of the registration parameters; and the gradient descent optimization may comprise converging to the single global minimum to estimate at least one of the one or more of the registration parameters. Furthermore, the performing the gradient descent optimization may comprise performing a dual formulation of the optimization or a primal formulation of the optimization; and the estimating the registration parameters may further comprise performing a plurality of iterations based on the calculating the Wasserstein distance and the performing the gradient descent optimization based on the Wasserstein distance.

Still further, the registration parameters may comprise a rotation angle, an x, y translation, or a scaling of the range profile data relative to the template range profile data. Additionally, the stripmap SAR system 200 may further comprise storing the template range profile data in the storage and updating a SAR navigation based on a deviation from the template range profile data.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Further, the disclosure comprises embodiments according to the following clauses.

Clause 1. A method, comprising: receiving, by a system comprising a processor, stripmap range profile data associated with observed views of a scene, wherein the stripmap range profile data comprises information captured via a synthetic aperture radar (SAR) that is operating in a stripmap mode; transforming the received stripmap range profile data into partial circular range profile data; and comparing the partial circular range profile data to a template range profile data of the scene; and estimating registration parameters associated with the partial circular range profile data relative to the template range profile data to determine a deviation from the template range profile data.

Clause 2. The method of clause 1, wherein: the received stripmap range profile data is stored in a data grid structure within a storage, and the transforming the received stripmap range profile data into the partial circular range profile data comprises: decomposing the stripmap range profile data into components corresponding to different sectors of an antenna beam of an approximately normal positioned antenna having a defined beamwidth; extracting angular range profile data corresponding to different illumination angles within the defined beamwidth; and range adjusting the angular range profile data to produce the partial circular range profile data.

Clause 3. The method of clause 2, wherein the extracting comprises: extracting Doppler components for stripmap range profile data; and assigning the extracted Doppler components to the different sectors of the antenna beam.

Clause 4. The method of clause 3, wherein: the decomposing comprises determining an azimuth signal; and the extracting the partial circular range profile data comprises: bandpass filtering the azimuth signal to produce a plurality of return signal frequency bins; determining a Doppler angle for each return signal frequency of the plurality of return signal frequency bins; and storing the Doppler angle for each return signal frequency in a return signal angle bin corresponding to the angular range profile data.

Clause 5. The method of clause 4, wherein the range adjusting comprises geometrically transforming the angular range profile data into the partial circular range profile data.

Clause 6. The method of any of clauses 1, 2, 3, 4, or 5, wherein: the comparing comprises calculating a Wasserstein distance corresponding to the range profile data with respect to the template range profile data; and the Wasserstein distance identifies a global minimum of one or more of the registration parameters.

Clause 7. The method of clause 6, wherein the Wasserstein distance comprises a p-Wasserstein distance or a 2-Wasserstein distance.

Clause 8. The method of clause 6 or 7, wherein the estimating comprises performing a gradient descent improvement based on the Wasserstein distance to estimate one or more of the registration parameters.

Clause 9. The method of clause 7 or 8, wherein: the Wasserstein distance, based on one or more of the registration parameters, comprises a smooth energy landscape with a single global minimum corresponding to values for one or more of the registration parameters; and the gradient descent improvement comprises converging to the single global minimum to estimate at least one of the one or more of the registration parameters.

Clause 10. The method of clause 8 or 9, wherein: the performing the gradient descent improvement comprises performing a dual formulation of an improvement or a primal formulation of the improvement; and the estimating the registration parameters further comprises performing a plurality of iterations based on the calculating the Wasserstein distance and the performing the gradient descent improvement based on the Wasserstein distance.

Clause 11. The method of any of clauses 1, 2, 3, 4, 5, 6, 7, 8, 9 or 10, wherein the registration parameters comprise one of a rotation angle, an x, y translation, or a scaling of the range profile data relative to the template range profile data.

Clause 12. The method of any of clauses 1, 2, 3, 4, 5, 6, 7, 8, 9, 10, or 11, further comprising storing the template range profile data in the storage and updating a SAR navigation based on the deviation from the template range profile data.

Clause 13. An aerial vehicle adapted to perform the method of any of clauses 1, 2, 3, 4, 5, 6, 7, 8, 9, 10, 11, or 12, the aerial vehicle comprising: a memory comprising a plurality of executable instructions and adapted to store template range profile data; a SAR sensor; and one or more processing units adapted to execute the plurality of executable instructions to perform the method of any of clauses 1, 2, 3, 4, 5, 6, 7, 8, 9, 10, 11, or 12.

Clause 14. A stripmap synthetic aperture radar (SAR) system, comprising: a memory; one or more processing units; a machine-readable medium on the memory, the machine-readable medium storing instructions that, when executed by the one or more processing units, cause the stripmap SAR system to perform operations comprising: receiving stripmap range profile data associated with observed views of a scene; transforming the received stripmap range profile data into partial circular range profile data; comparing the partial circular range profile data to a template range profile data of the scene; and estimating registration parameters associated with the partial circular range profile data relative to the template range profile data to determine a deviation from the template range profile data.

Clause 15. The stripmap SAR system of clause 14, wherein: the received stripmap range profile data is stored in a data grid structure within a storage; and the transforming the received stripmap range profile data into the partial circular range profile data comprises: decomposing the stripmap range profile data in storage into components corresponding to different sectors of an antenna beam of an approximately normal positioned antenna having a beamwidth; extracting angular range profile data corresponding to different illumination angles within the beamwidth; and range adjusting the angular range profile data to produce the partial circular range profile data.

Clause 16. The stripmap SAR system of clause 14 or 15, wherein extracting comprises: extracting Doppler components for stripmap range profile data in storage; and assigning the extracted Doppler components to the different sectors of the antenna beam.

Clause 17. The stripmap SAR system of clause 16, wherein: the decomposing comprises determining an azimuth signal; and the extracting the partial circular range profile data comprises: bandpass filtering the azimuth signal to produce a plurality of return signal frequency bins; determining a Doppler angle for each return signal frequency of the plurality of return signal frequency bins; and storing the Doppler angle for each return signal frequency in a return signal angle bin corresponding to the angular range profile data.

Clause 18. The stripmap SAR system of clause 17, wherein range adjusting comprises geometrically transforming the angular range profile data into the partial circular range profile data.

Clause 19. The stripmap SAR system of any of clauses 14, 15, 16, 17, or 18, wherein: the comparing comprises calculating a Wasserstein distance corresponding to the range profile data with respect to the template range profile data; and the Wasserstein distance identifies a global minimum of one or more of the registration parameters.

Clause 20. The stripmap SAR system of clause 19, wherein the Wasserstein distance comprises a p-Wasserstein distance or a 2-Wasserstein distance.

Clause 21. The stripmap SAR system of clause 19 or 20, wherein the estimating comprises performing a gradient descent optimization based on the Wasserstein distance to estimate one or more of the registration parameters.

Clause 22. The stripmap SAR system of clause 21, wherein: the Wasserstein distance, based on one or more of the registration parameters, comprises a smooth energy landscape with a single global minimum corresponding to optimal values for one or more of the registration parameters; and the gradient descent optimization comprises converging to the single global minimum to estimate at least one of the one or more of the registration parameters.

Clause 23. The stripmap SAR system of clause 21 or 22, wherein: the performing the gradient descent optimization comprises performing a dual formulation of the optimization or a primal formulation of the optimization; and the estimating the registration parameters further comprises performing a plurality of iterations based on the calculating the Wasserstein distance and the performing the gradient descent optimization based on the Wasserstein distance.

Clause 24. The stripmap SAR system of any of clauses 14, 15, 16, 17, 18, 19, 20, 21, 22, or 23, wherein the registration parameters comprise one of a rotation angle, an x, y translation, or a scaling of the range profile data relative to the template range profile data.

Clause 25. The stripmap SAR system of any of clauses 14, 15, 16, 17, 18, 19, 20, 21, 22, 23, or 24, further comprising: storing the template range profile data in a storage; and updating a SAR navigation based on the deviation from the template range profile data.

Clause 26. A stripmap synthetic aperture radar (SAR) system on a vehicle, the stripmap SAR system comprising: an antenna that is fixed and directed outward from a side of the vehicle; a SAR sensor; a storage; and a computing device, wherein the computing device comprises a memory, one or more processing units, and a machine-readable medium on the memory, the machine-readable medium storing instructions that, when executed by the one or more processing units, cause the stripmap SAR system to perform operations comprising: receiving stripmap range profile data associated with observed views of a scene; transforming the received stripmap range profile data into partial circular range profile data; comparing the partial circular range profile data to a template range profile data of the scene; and estimating registration parameters associated with the partial circular range profile data relative to the template range profile data to determine a deviation from the template range profile data.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

It is claimed:

1. A method, comprising:
    receiving, by a system comprising a processor, stripmap range profile data associated with observed views of a scene, wherein the stripmap range profile data comprises information captured via a synthetic aperture radar (SAR) that is operating in a stripmap mode;
    transforming the received stripmap range profile data into partial circular range profile data;
    comparing the partial circular range profile data to a template range profile data of the scene;
    estimating registration parameters associated with the partial circular range profile data relative to the template range profile data to determine a deviation from the template range profile data;
    wherein the transforming comprises:
        decomposing the stripmap range profile data into components corresponding to different sectors of an antenna beam of an approximately normal positioned antenna having a defined beamwidth, the decomposing comprising determining an azimuth signal, and
        extracting angular range profile data corresponding to different illumination angles within the defined beamwidth; and
    wherein the extracting comprises:
        bandpass filtering the azimuth signal to produce a plurality of return signal frequency bins, determining a Doppler angle for each return signal frequency of the plurality of return signal frequency bins, and storing the Doppler angle for each return signal frequency in a return signal angle bin corresponding to the angular range profile data.

2. The method of claim 1, wherein:
the received stripmap range profile data is stored in a data grid structure within a storage, and
the transforming the received stripmap range profile data into the partial circular range profile data comprises:
range adjusting the angular range profile data to produce the partial circular range profile data.

3. The method of claim 2, wherein the extracting comprises:
extracting Doppler components for stripmap range profile data; and
assigning the extracted Doppler components to the different sectors of the antenna beam.

4. The method of claim 2, wherein the range adjusting comprises geometrically transforming the angular range profile data into the partial circular range profile data.

5. The method of claim 1, wherein:
the comparing comprises calculating a Wasserstein distance corresponding to the range profile data with respect to the template range profile data; and
the Wasserstein distance identifies a global minimum of one or more of the registration parameters.

6. The method of claim 5, wherein the estimating comprises performing a gradient descent improvement based on the Wasserstein distance to estimate one or more of the registration parameters.

7. The method of claim 6, wherein:
the performing the gradient descent improvement comprises performing a dual formulation of an improvement or a primal formulation of the improvement; and
the estimating the registration parameters further comprises performing a plurality of iterations based on the calculating the Wasserstein distance and the performing the gradient descent improvement based on the Wasserstein distance.

8. The method of claim 1, wherein the registration parameters comprise one of a rotation angle, an x, y translation, or a scaling of the range profile data relative to the template range profile data.

9. The method of claim 1, further comprising
storing the template range profile data in the storage, and
updating a SAR navigation based on the deviation from the template range profile data.

10. An aerial vehicle adapted to perform the method of claim 1, the aerial vehicle comprising:
a memory comprising a plurality of executable instructions and adapted to store template range profile data;
a SAR sensor; and
one or more processing units adapted to execute the plurality of executable instructions to perform the method of claim 1.

11. A stripmap synthetic aperture radar (SAR) system, comprising:
a memory;
one or more processing units; and
a machine-readable medium on the memory, the machine-readable medium storing instructions that, when executed by the one or more processing units, cause the stripmap SAR system to perform operations comprising:

receiving stripmap range profile data associated with observed views of a scene;
transforming the received stripmap range profile data into partial circular range profile data;
comparing the partial circular range profile data to a template range profile data of the scene;
estimating registration parameters associated with the partial circular range profile data relative to the template range profile data to determine a deviation from the template range profile data;
wherein the transforming comprises:
decomposing the stripmap range profile data into components corresponding to different sectors of an antenna beam of an approximately normal positioned antenna having a defined beamwidth, the decomposing comprising determining an azimuth signal, and
extracting angular range profile data corresponding to different illumination angles within the defined beamwidth; and
wherein the extracting comprises:
bandpass filtering the azimuth signal to produce a plurality of return signal frequency bins,
determining a Doppler angle for each return signal frequency of the plurality of return signal frequency bins, and
storing the Doppler angle for each return signal frequency in a return signal angle bin corresponding to the angular range profile data.

12. The stripmap SAR system of claim 11, wherein:
the received stripmap range profile data is stored in a data grid structure within a storage; and
the transforming the received stripmap range profile data into the partial circular range profile data comprises:
range adjusting the angular range profile data to produce the partial circular range profile data.

13. The stripmap SAR system of claim 12, wherein extracting comprises:
extracting Doppler components for stripmap range profile data in storage; and
assigning the extracted Doppler components to the different sectors of the antenna beam.

14. The stripmap SAR system of claim 12, wherein range adjusting comprises geometrically transforming the angular range profile data into the partial circular range profile data.

15. The stripmap SAR system of claim 11, wherein:
the comparing comprises calculating a Wasserstein distance corresponding to the range profile data with respect to the template range profile data; and
the Wasserstein distance identifies a global minimum of one or more of the registration parameters.

16. The stripmap SAR system of claim 11, wherein the registration parameters comprise one of a rotation angle, an x, y translation, or a scaling of the range profile data relative to the template range profile data.

17. The stripmap SAR system of claim 11, further comprising:
storing the template range profile data in a storage; and
updating a SAR navigation based on the deviation from the template range profile data.

18. A stripmap synthetic aperture radar (SAR) system on a vehicle, the stripmap SAR system comprising:
an antenna that is fixed and directed outward from a side of the vehicle;
a SAR sensor;
a storage; and a computing device, wherein the computing device comprises:
a memory,
one or more processing units, and
a machine-readable medium on the memory, the machine-readable medium storing instructions that, when executed by the one or more processing units, cause the stripmap SAR system to perform operations comprising:
receiving stripmap range profile data associated with observed views of a scene;
transforming the received stripmap range profile data into partial circular range profile data;
comparing the partial circular range profile data to a template range profile data of the scene;
estimating registration parameters associated with the partial circular range profile data relative to the template range profile data to determine a deviation from the template range profile data;
wherein the transforming comprises:
decomposing the stripmap range profile data into components corresponding to different sectors of an antenna beam of an approximately normal positioned antenna having a defined beamwidth, the decomposing comprising determining an azimuth signal, and
extracting angular range profile data corresponding to different illumination angles within the defined beamwidth; and
wherein the extracting comprises:
bandpass filtering the azimuth signal to produce a plurality of return signal frequency bins,
determining a Doppler angle for each return signal frequency of the plurality of return signal frequency bins, and
storing the Doppler angle for each return signal frequency in a return signal angle bin corresponding to the angular range profile data.

19. An aerial vehicle comprising:
a SAR sensor; and
the stripmap SAR system of claim 11.

20. The aerial vehicle of claim 19, further comprising an antenna that is fixed and directed outward from a side of the aerial vehicle.

* * * * *